US011416997B2

(12) United States Patent
Ippolito et al.

(10) Patent No.: US 11,416,997 B2
(45) Date of Patent: Aug. 16, 2022

(54) SYSTEMS, METHODS, AND APPARATUSES FOR IMAGE CAPTURE AND DISPLAY

(71) Applicant: Life Technologies Corporation, Carlsbad, CA (US)

(72) Inventors: Kim Ippolito, South Park, PA (US); Jonathan Paullin, Kirkland, WA (US); Richard Salisbury, Sewickley, PA (US); Laurel Stone, Eugene, OR (US); Ethan Melious, Carlsbad, CA (US); Audra Ziegenfuss, Baden, PA (US); Erik Persmark, Eugene, OR (US)

(73) Assignee: LIFE TECHNOLOGIES CORPORATION, Carlsbad, UT (US)

( * ) Notice: Subject to any disclaimer, the term of this patent is extended or adjusted under 35 U.S.C. 154(b) by 622 days.

(21) Appl. No.: 15/593,760

(22) Filed: May 12, 2017

(65) Prior Publication Data

US 2017/0330327 A1    Nov. 16, 2017

Related U.S. Application Data

(60) Provisional application No. 62/335,422, filed on May 12, 2016.

(51) Int. Cl.
*G06T 7/11* (2017.01)
*G02B 21/36* (2006.01)

(52) U.S. Cl.
CPC .............. *G06T 7/11* (2017.01); *G02B 21/367* (2013.01); *G06T 2207/10056* (2013.01)

(58) Field of Classification Search
CPC ............ G06T 7/11; G06T 2207/10056; G02B 21/367
See application file for complete search history.

(56) References Cited

U.S. PATENT DOCUMENTS

| 7,932,504 | B2 | 4/2011 | Yamada | |
| 2005/0273867 | A1* | 12/2005 | Brulet | A01K 67/0275 800/8 |
| 2007/0083819 | A1* | 4/2007 | Shoemaker | G06T 3/0018 715/767 |
| 2009/0212242 | A1 | 8/2009 | Yamada | |

(Continued)

FOREIGN PATENT DOCUMENTS

| DE | 102004047519 A1 | 3/2006 |
| DE | 102012021726 A1 | 5/2014 |

(Continued)

OTHER PUBLICATIONS

JP Office Action cited in 2018-559386 dated May 10, 2021.
Chinese Office Action cited in 201780038056.8 dated Jul. 15, 2021.

*Primary Examiner* — Neil R Mikeska
(74) *Attorney, Agent, or Firm* — Workman Nydegger; Logan Christenson; John Guynn

(57) ABSTRACT

Provided are systems and methods that allow a user to capture images at low- and high-level magnification and then overlay the high-level magnification images on the low-level magnification image to ease review of the images. The high-level magnification images may be overlaid on the low-level magnification image based at least in part on the portion of the low-level magnification image from which the high-level image was originated.

20 Claims, 35 Drawing Sheets

(56) References Cited

U.S. PATENT DOCUMENTS

| | | | |
|---|---|---|---|
| 2010/0002071 A1* | 1/2010 | Ahiska | H04N 5/217 348/36 |
| 2012/0314049 A1* | 12/2012 | Gu | G02B 21/365 348/79 |
| 2014/0015856 A1* | 1/2014 | Xiao | G06T 19/00 345/629 |
| 2015/0003716 A1* | 1/2015 | Lloyd | G06F 19/321 382/133 |
| 2015/0238071 A1* | 8/2015 | Hua | A61B 1/07 600/109 |
| 2015/0241686 A1* | 8/2015 | Abe | G02B 21/367 348/79 |
| 2015/0301732 A1* | 10/2015 | Henderson | G01N 35/00 715/769 |
| 2015/0370061 A1* | 12/2015 | Weaver | G02B 13/22 348/239 |
| 2016/0183779 A1* | 6/2016 | Ren | A61B 3/0058 351/206 |
| 2017/0046842 A1* | 2/2017 | Yamaguchi | A61B 1/00009 |

FOREIGN PATENT DOCUMENTS

| | | |
|---|---|---|
| JP | 2003131142 A | 5/2003 |
| JP | 2009014939 | 1/2009 |
| JP | 2011-196867 | 10/2011 |
| WO | WO 2005-098508 A2 | 10/2005 |

\* cited by examiner

SYSTEMS, METHODS, AND APPARATUSES FOR IMAGE CAPTURE AND DISPLAY

RELATED APPLICATION

The present application claims priority to and the benefit of U.S. patent application No. 62/335,422, "Systems, Methods, And Apparatuses For Image Capture And Display" (filed May 12, 2016), the entirety of which application is incorporated herein by reference in its entirety for any and all purposes.

TECHNICAL FIELD

The present disclosure relates to the field of image capture and image overlay.

BACKGROUND

A familiar problem for investigators in a variety of disciplines—particularly cellular analysis—is the process of reviewing a sample image at comparatively low magnification to generate a background image, identifying areas of interest in that image, and then inspecting the areas of interest under higher magnification while also attempting to track from where within the larger background image the magnified area of interest originated. This process, however, often involves comparing low- and high-magnification images from separate computer files and is often tedious, time-consuming, and prone to errors. Accordingly, there is a long-felt need in the art for improved methods and systems of image capture and display.

SUMMARY

In meeting the described challenges, the present disclosure first provides methods of image analysis, the methods comprising: collecting, at a first level of magnification, at least one first level image of a sample; collecting, at a second level of magnification that is greater than the first level of magnification, a first second level image that comprises a region of the corresponding first level image; and overlaying the first second level image on the first level image.

The present disclosure also provides sample analysis systems, comprising: an imaging device configured to (a) collect first sample images at a first level of magnification and (b) collect second sample images at a second level of magnification that is greater than the first level of magnification, a second sample image comprising a region at least partially disposed within a corresponding first image; and a processor configured to effect overlaying the second image on the first image.

Additionally provided are methods of image analysis, comprising: collecting, at a first level of magnification, at least one first sample image; collecting, at a second level of magnification that is greater than the first level of magnification, at least one second sample image that comprises a region at least partially disposed within the corresponding first image; aligning a feature of the second image with the corresponding feature of the first image; and overlaying the second image on the first image.

Also provided are methods of image analysis, comprising: collecting, at a first level of magnification, a plurality of first sample images; for each member of a set of at least some of the plurality of first sample images, collecting at a second level of magnification greater than the first level of magnification one or more second sample images that comprises a region at least partially disposed within that corresponding first sample image; for at least some of (or even for each of) those members of the set of first sample images, aligning a feature of each of the one or more second sample images with the corresponding feature of that corresponding first sample image; and overlaying the one or more second sample images on the corresponding first sample image.

Also provided are sample analysis systems, comprising: an imaging device configured to (a) collect first sample images at a first level of magnification and (b) collect second sample images at a second level of magnification that is greater than the first level of magnification, a second sample image comprising a region at least partially disposed within a corresponding first sample image; a processor configured to effect (a) aligning a feature of at least one collected second sample image with the corresponding feature of the first sample image that corresponds to that second sample image and (b) overlaying the second image on the first sample image.

BRIEF DESCRIPTION OF THE DRAWINGS

The summary, as well as the following detailed description, is further understood when read in conjunction with the appended drawings. For the purpose of illustrating the disclosed subject matter, there are shown in the drawings exemplary embodiments of the disclosed subject matter; however, the disclosed subject matter is not limited to the specific methods, compositions, and devices disclosed. In addition, the drawings are not necessarily drawn to scale. In the drawings.

DETAILED DESCRIPTION OF ILLUSTRATIVE EMBODIMENTS

The present disclosure can be understood more readily by reference to the following detailed description taken in connection with the accompanying figures and examples, which form a part of this disclosure. It is to be understood that this disclosure is not limited to the specific devices, methods, applications, conditions or parameters described and/or shown herein, and that the terminology used herein is for the purpose of describing particular embodiments by way of example only and is not intended to be limiting of the claimed subject matter. Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

It is to be appreciated that certain features of the disclosed subject matter which are, for clarity, described herein in the context of separate embodiments, can also be provided in combination in a single embodiment. Conversely, various features of the disclosed subject matter that are, for brevity, described in the context of a single embodiment, can also be provided separately or in any subcombination. Further, reference to values stated in ranges includes each and every value within that range. Any documents cited herein are incorporated herein by reference in their entireties for any and all purposes.

In one aspect, the present disclosure provides methods of image analysis. The methods comprise collecting, at a first level of magnification, at least one first level image of a sample; collecting, at a second level of magnification that is greater than the first level of magnification, a first second level image (e.g., collected at the second level of magnification) that comprises a region of the corresponding first level image; and overlaying the first second level image on the first level image.

Figure 26:
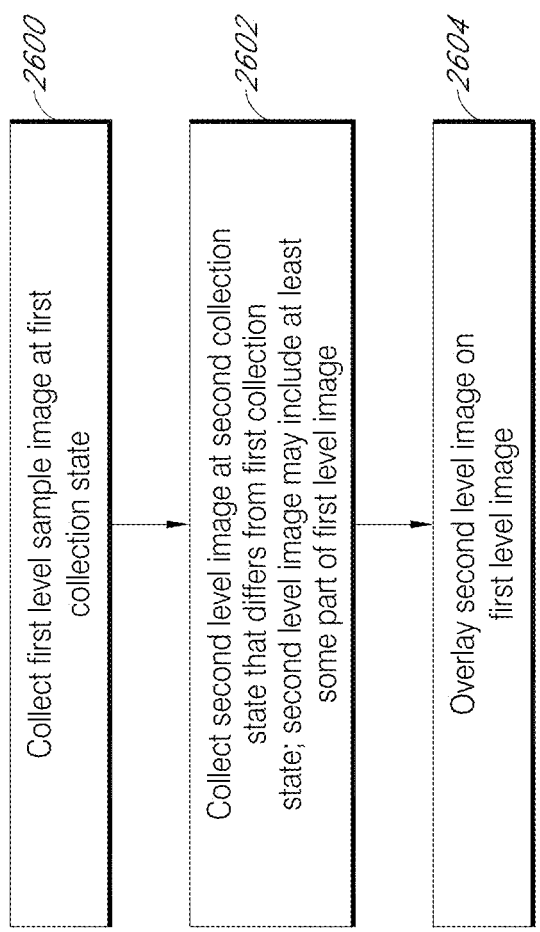
FIG. 26 provides a depiction of further alternative methods according to the present disclosure.

FIG. 26 provides an exemplary illustration of these methods. As shown, the methods may include step 2600, which step comprises collecting a first level sample image at a first collection state. Step 2602 then includes collecting a second level image at a second collection state that differs greater than first collection state; the second level image may include at least some part of first level image. (As described elsewhere, collection state refers to the conditions under which an image is collected, e.g., one or more of magnification, illumination, irradiation, and the like.) In step 2604, the second level image is overlaid on the corresponding first level image.

A first level of magnification may be essentially any level, e.g., 1×, 2×, 5×, 10×, 20×, 30×, 40×, 50×, 100×, 200×, 500×, 1000× or higher (or any intermediate value), dependent on the user's needs. The second level of magnification is suitably greater than the first level of magnification by a factor of from about 1.01 (i.e., the second level of magnification is 1.01 times the first level magnification) to about 10,000, e.g., from about 5 to about 5,000, from about 10 to about 1,000, from about 20 to about 500, from about 50 to about 100, and all intermediate values. A first level of illumination may be typical white light, but may also be colored light or light selected to excite one or more fluorescent molecules. Illumination or other conditions may also be selected to give rise to the detectability and/or activity (e.g., detectable activity) of a phosphorescent molecule.

As one illustrative example, the first level of magnification may be about 2×, and the second level of magnification may be about 20×. Different levels of magnification may be achieved by, e.g., switching between objective lenses.

The first second level (i.e., higher magnification level) image may be overlaid on the first level (i.e., lower magnification level) image. This may be done such that the first second level image is positioned according to (e.g., over) the region of the first level image that is comprised in the first second level image. The overlaying may be done according to a coordinate system or other spatial relationship scheme. It is not, however, a requirement that a second level image be exactly overlaid on a first level image such that the position of the second level image is reflective of the region of the first level image from where the second level image originated. In some instances it is may be preferable to align/position the second level image over the first level image such that the region shown in the second level image overlies (exactly, or nearly so) the region of the first level image from where the second level image was taken.

As one non-limiting illustration, a user may collect a first level image. That image contains within a cell, which cell has a width of 5 cm on the user's video screen. The user then collects a second level image, which second level image includes the cell of interest of the first level image.

The second level image is then overlaid on the first level image so as to overlie the region of the first level image from where the second level image was taken. In doing so, the second level image may be sized such that the length scale in the second level image is congruent with the length scale of the first level image such that the cell when shown in the second level image overlaid on the first level image has a width of 5 cm (as in the first level image), but the cell—by virtue of being collected at the higher, second level of magnification—is now visible at a higher resolution.

The disclosed technology may also—as described elsewhere herein—zoom in or otherwise expand first or second images. The disclosed technology may further align a second level image over a first level image, e.g., by positioning a second level image over a corresponding first level image such that a feature of the second level image overlies that feature of the corresponding first level image.

In one exemplary embodiment, a user may select as a second level image an image that resides at location (3, 4) on a 10×10 coordinate system of the first level image. The second level image may then be overlaid on the first level image such that the second level image is centered at (or otherwise placed near to) location (3, 4) on the 10×10 coordinate system of the first level image. Alternatively, the second level image may be overlaid such that the second level image overlaps location (3, 4), though the second level image need not necessarily be centered at location (3, 4). As described elsewhere herein, the second level image may overlaid in such a way that the second level image expands when a user selects the image or positions a cursor or other pointer over the second level image.

As another example, a user may select as a second level image an image that includes some feature (e.g., a vacuole) that is also disposed within the background first level image. The second level image may be overlaid on the first level image such that the vacuole in the second level image is centered at (or otherwise placed near to) the vacuole in the first level image. This may be accomplished manually (e.g., by a user dragging the second level image to the desired location over the first level image) or in an automated fashion (e.g., by an image alignment algorithm). Alignment may, as described elsewhere herein, be effected in a variety of ways, e.g., by overlapping a region of the first second level image with a region of the second second level image. Alignment may also be effected by overlapping (or nearly overlapping) one or more features of the first and second second level images with one another.

It should be understood a second level image may comprise an area of a sample that is already completely comprised within a first level image. This, however, is not a requirement, as a second level image may include an area that is comprised within a first level image and an area that is not comprised within that first level image. As one example, a second level image may be centered on an edge of a first level image such that the second level image includes material that is within the first level image and material that is not within the first level image.

In one embodiment, the result is a first level image having a higher-magnification second level image overlaid thereon. The second level image may be positioned such that it precisely overlies the portion of the first image from which the second image was taken. Without being bound to any particular theory, the second level image may be thought of as a comparatively higher resolution window or lens through which the user may view a region of interest in the first level window while still showing that object of interest in its original positional context in the first level image. One such example is shown in FIG. 21, which figure is described elsewhere herein.

It should be understood, however, that there is no requirement that the second level image be overlaid precisely over the region of the first image that is reflected by the second level image. For example, if a first level image is centered at location (3,4) in a 10×10 coordinate system, a second level image that includes the region of the first level image around location (3,4), when overlaid on the first image, may be centered at (3,4), but may also be centered at (3.1, 4.2).

The disclosed methods also comprise collecting a second second level image that comprises a region of the corresponding first level image. The second second level image may be collected at the same or different magnification and/or illumination as the first second level image. It should be understood that the disclosed methods and systems contemplate collection of images at two, three, or more magnifications and/or illumination types. The second second level image may comprise a region of the first second level image, though this is not a requirement.

The methods may also comprise aligning (e.g., positioning) the first second level image and the second second level image such that the first second level image and the second second level images form a contiguous image of a region of the corresponding first level image, e.g., such that the aligned second level images span a region of the first level image.

Alignment may be effected in a variety of ways, e.g., by overlapping a region of the first second level image with a region of the second second level image. Alignment may also be effected by overlapping (or nearly overlapping) one or more features (e.g., edges) of the first and second second level images with one another. In some embodiments, a system may operate to force an overlap that is greater than the error in the moving stage of the system.

A variety of alignment/registration algorithms may be used. In some applications, the disclosed technology may be used to form, from a first level image, a set of tiled second level images that cover from about 5 to 100% of the content of the first level image.

In some cases, a feature of interest (e.g., a cell) may be too large to fit within a single second-level (high-magnification) image. In such situations, the system may calculate the number of second-level images needed to cover the entire feature and then align those second-level images together as needed so as to form a complete picture of that feature of interest.

The disclosed methods may also comprise overlaying the first second level image and the second second level images on the first level image. One such example is shown in FIG.

11, which FIG. shows multiple second level magnification images overlaid on a background first level image.

The first second level image and the second second level image may be overlaid on the first level image such that they are positioned relative to one another according to the regions of the first level image that are comprised in the first second level image and the second second level image. By reference to the exemplary 10×10 coordinate system described elsewhere herein, a first second level image taken (e.g., centered) at location (3, 4) may be overlaid so as to be centered over that location on the first level image, and a second second level image taken at location (7, 9) may be overlaid so as to be centered over that other location on the first level image.

As described elsewhere herein, a first level image and a second level image are each collected under different illumination conditions. For example, a first level image may be gathered under standard "white" light, and a second level image may be collected under illumination conditions that are optimized for visualizing a particular fluorescent dye. Also as described elsewhere herein, different second level images may be collected at different magnification and/or illumination conditions from one another. It should be understood that images themselves may contain one, two, or even more fluorescence colors. For instance, the user may use white (transmitted) light for the first lower-magnification images, and then take several images at the same position with the same higher magnification but different lighting conditions. Each image contains different aspects of the same cell (nuclei in image 1, cytoplasm in image 2, neurites in image 3), and the images combined together to display a "merged" (or "composite") image, which contains a color image of the nuclei, cytoplasm, and neurites. Thus, the technology may give rise to a high-resolution merged color image of the cell, with the grayscale low-resolution transmitted image of the cell in the background. In addition to changing lighting conditions, one may also change the detection mechanism. One may vary the camera that is used (e.g., via color and mono cameras), the detection mode (such as widefield or confocal), or any combination thereof.

The location of a first level image may be selected in an automated fashion. Alternatively, the location of a first level image may be selected manually. For example, a user scanning a well plate may manually select the left-hand edge of a well for collecting a first level image. Alternatively, the location of the first level image may be selected automatically, e.g., automated selection of the center of each well on a well plate. Similarly, the selection of the location of a second level image may be effected manually or in an automated fashion.

The location of the first second level image may be selected such that the first second level image comprises a feature of interest in the first level image. For example, a second level image's location (and or shape) may be such that the second level image includes within it one or more cells that are shown in the first level image.

A user may, from a view of the first image, select and display the second image. As described elsewhere herein, this may be done in such a way that the second level image expands when a user viewing the first level image with a second level image overlaid on top of that first level image clicks on the image or positions a cursor or other pointer over the second level image, after which the second level image expands or even opens up a new viewing window.

The user may set the shape (square, rectangular, polygonal, or custom) of a first or second level image in an automated or manual fashion. This may be done via a menu (e.g., a drop-down menu or other selection tool) of image shape choices. The shape of the first or second level image may also be set in an automated fashion, e.g., set such that a particular feature is at least partially within the image.

Figure 22:
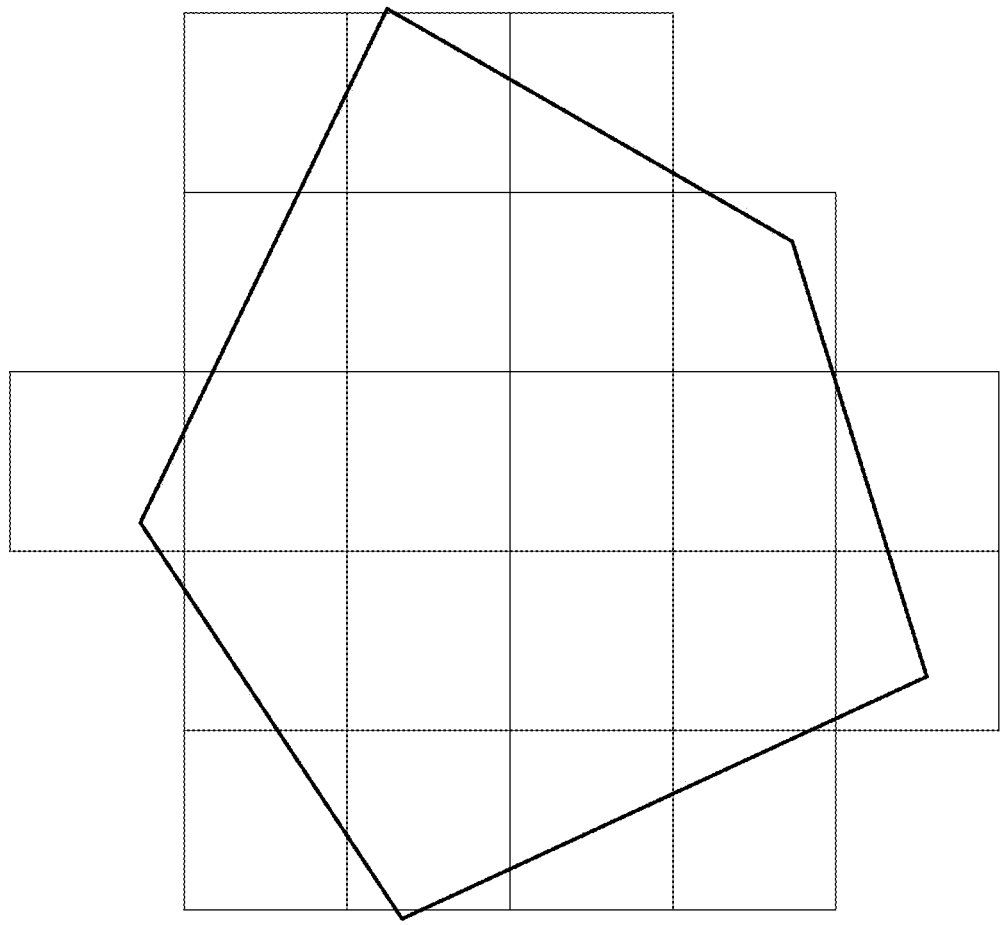
FIG. 22 provides an exemplary depiction of a user-drawn freeform area (heavy border) over a low-magnification image from which a system may set the scan area such that a suitable number of the high-magnification images are acquired to ensure that the entire freeform area is captured at the higher magnification (represented by the lighter-bordered boxes)

A system may provide one or more of a rectangle, ellipse, circle, or even a freeform tool to define a region of interest. In some embodiments, these tools need not define the shape of the image, but rather where to collect the images. For instance, the low-magnification image may display an entire sample well under consideration, and a user may use the free-form tool to define the location of where the cell or cells of interest lie within the well. In one illustrative embodiment, a user who wants to acquire a second set of images at a high-magnification (e.g., 40×), then the software may automatically scan multiple adjacent images within that defined shape so as to cover the entire user-selected shape. As shown in exemplary FIG. 22, a user may draw a freeform shape in black, and the system may set the scan area (e.g., in an automated fashion) such that a suitable number (e.g., 22 images) of the high-magnification images are acquired to ensure that the entire freeform area is captured at the higher magnification (represented by the gray-bordered boxes).

Figure 23:
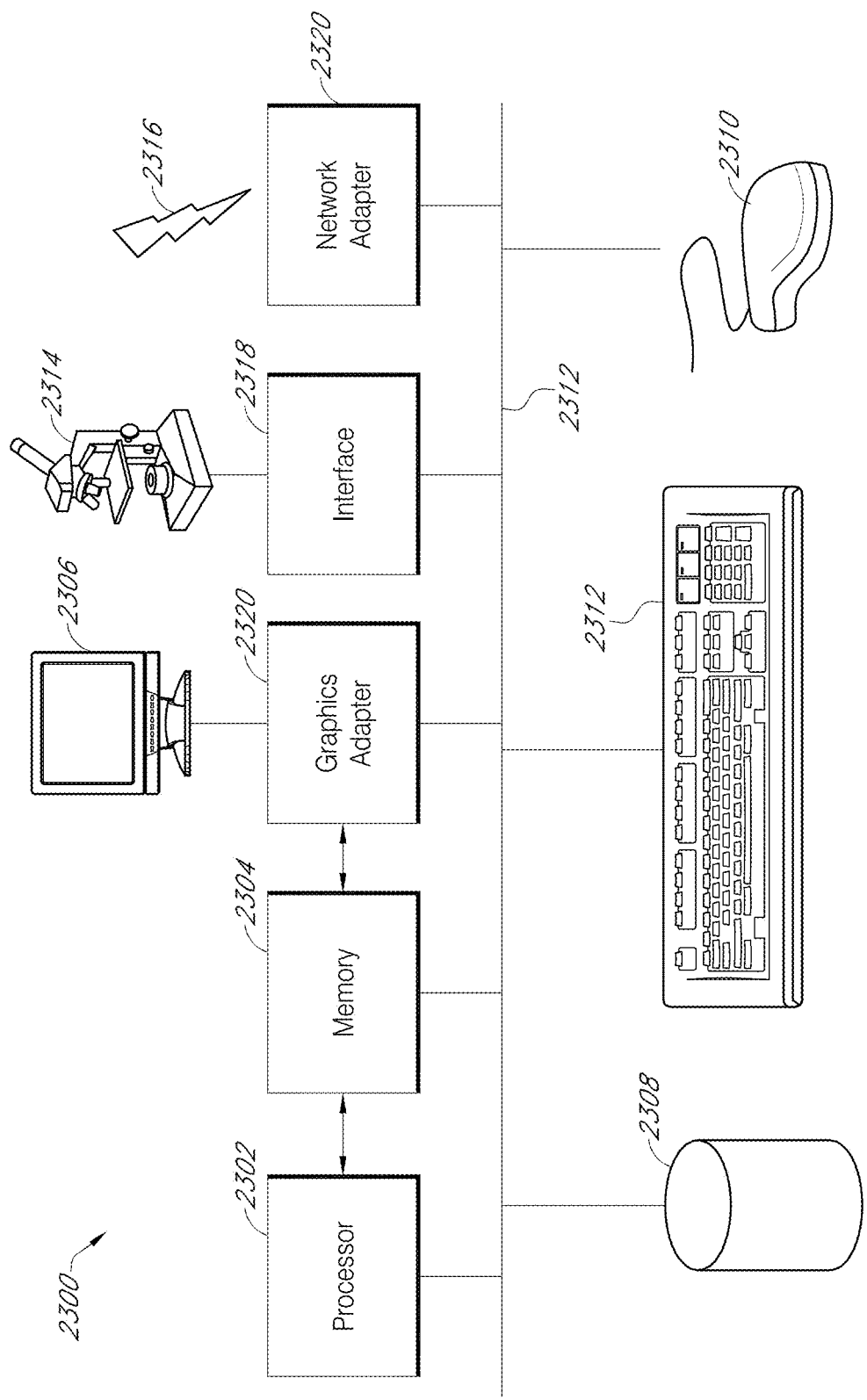
FIG. 23 provides a depiction of an exemplary system according to the present disclosure.

FIG. 23 provides an exemplary view of a system 2300 according to the present disclosure. As shown, the system 2300 may include an imager 2314, which imager may be, e.g., a microscope, high content screening device, and the like. The imager 2314 may be in electronic communication with other components via an interface 2318. One or more of the various components may be in communication with one another via linkage 2312. The system 2300 may also comprise a keyboard 2312 and a pointing device 2310, which components may be used to control, e.g., image collection, image analysis, image storage, and the like. Images collected by imager 2314 may be communicated to the display 2306, which may be connected to other components via graphics adapter 2320.

The graphics adapter 2320 may be in communication with memory 2304, which memory may also be in communication with processor 2302. The processor may be configured to perform one or more of the disclosed steps, e.g., overlaying a higher-magnification image over a lower-magnification image, aligning a second level image over a first level image, and the like. Hard drive 2308 is suitably in communication with one or more other components, and may be configured to receive and retain one or more images, whether the images are in raw or processed form. System 2300 may also include a network adapter 2320, which adapter may send or receive information 2316 wirelessly or via cable or wire connections.

In some embodiments, a user may first collect a first level image. The user may then define a second level magnification region (e.g., via defining the shape of the border of an area for second level magnification), which second level magnification region may be present as, e.g., a rectangular window that appears overlaid on the first level image. The user may then translate (e.g., via clicking, dragging, or otherwise moving) the second level magnification region around the first level image so as to view—in real time—regions of the first level image at higher magnification/resolution. A system may be configured so as to scale the second level (higher magnification) image such that the length scale in the second level image corresponds to the length scale of the first image. In this way, a user may view, in real time, higher-resolution fields of a first level image as the second level image window translates around the first level image. This in turn allows a user to view a higher-resolution "window" of a region of the first level image while also maintaining that window in its relative positional context.

When the user identifies a particular region of interest in the first level image, the user may then take a second-level magnification "snapshot" of that region of interest, which snapshot remains overlaid on the first level image. In this way, a user may collect second level images of interest in real-time while reviewing part or all of a first-level image.

In this way, a user may be presented with a view that allows the user to easily determine the location(s) on the first level image from where the second level images were generated. This in turn allows users to determine the relative positions of the second level images, enabling the user to quickly determine which areas of the first level image had been subjected to higher-magnification review.

One exemplary embodiment is shown in FIG. 21. As shown by FIG. 21A, a user may define a second level region of magnification (shown by dashed box) on a first level image. In this example, the first level image is a circular image of a well with an object of interest disposed within the well. As shown in FIG. 21A, as a result of the relatively low magnification for the first-level image, it is difficult to discern certain details of the object of interest, such as the precise contours of the edge of the object.

Figure 21B:
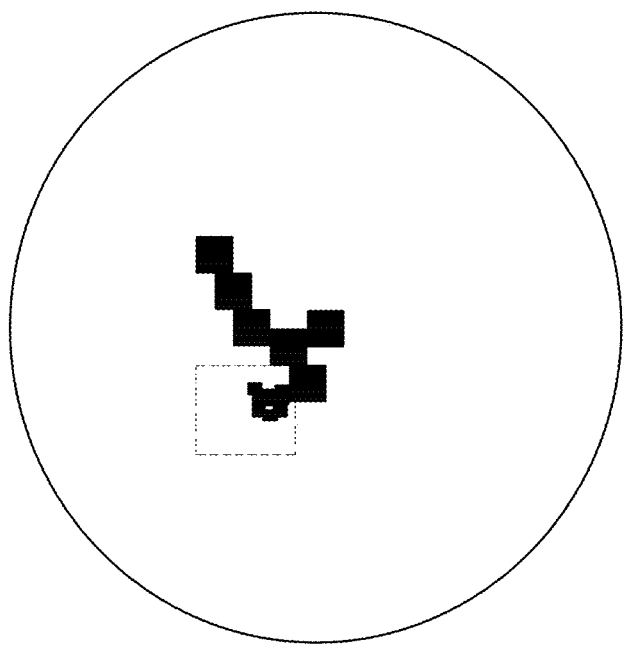
FIG. 21B illustrates selecting in real time a first "snapshot" of the first level image at the second level of magnification, which first level "snapshot" remains overlaid on the first level image.
Figure 21A:
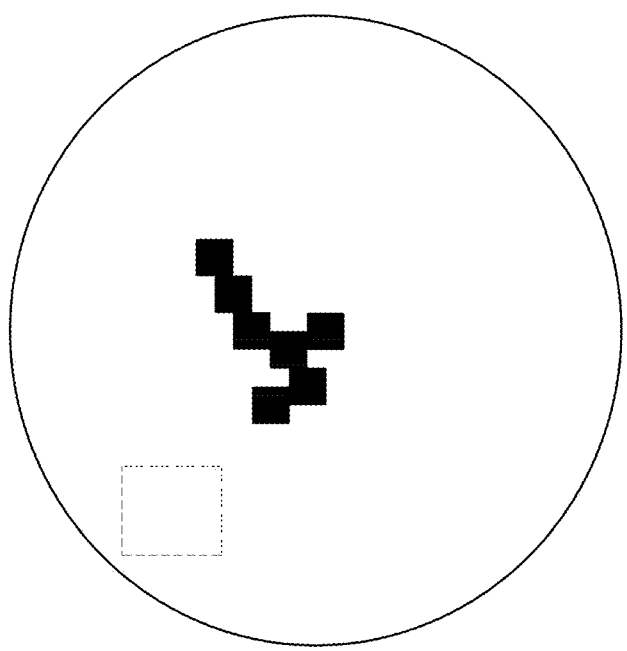
FIG. 21A provides a schematic view of defining a second level region of magnification on a first level image.
Figure 21D:
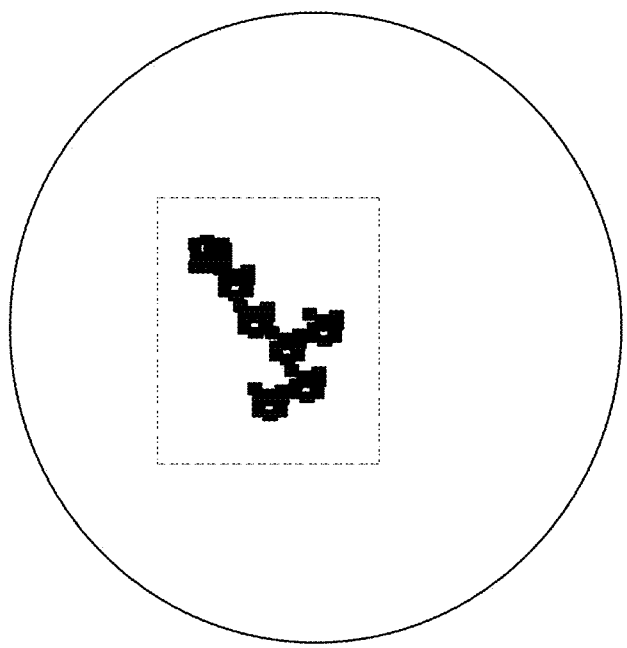
FIG. 21C illustrates selecting (e.g., in real time) a second "snapshot" of the first level image at the second level of magnification, which second "snapshot" remains overlaid on the first level image, and FIG. 21D provides an alternative view in which the user has created a second level image that encompasses the entirety of the object of interest shown in FIG. 21A.
Figure 21C:
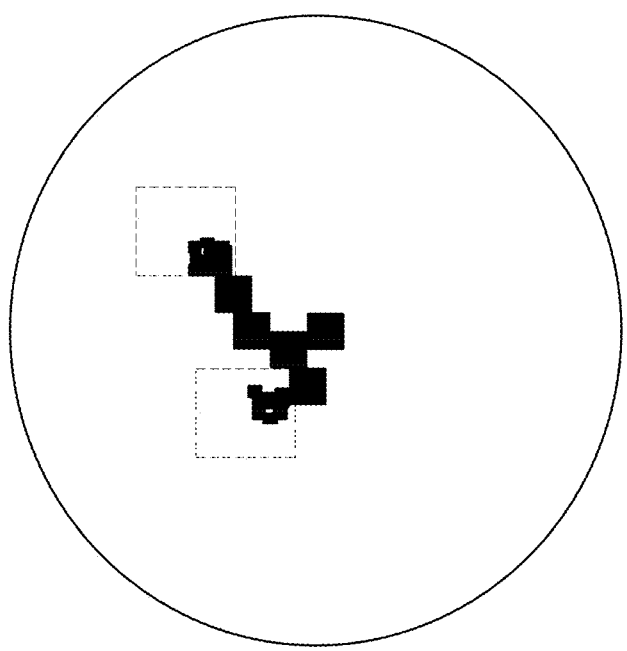

As shown in FIG. 21B, the user may move the defined second level region of magnification around the first level image and then select a region of interest as a "snapshot," which snapshot remains (as shown in FIG. 21B and FIG. 21C) overlaid on the first image. Also as shown in FIG. 21B and FIG. 21C, after generating a first "snapshot" (which snapshot remains overlaid on the first level background image), a user may generate further second level magnification snapshots as other areas of interest are identified.

As shown in FIG. 21B, the second level "snapshot" is overlaid above the first level image. But as can be seen in FIG. 21B, the "snapshot"—because it was taken at a relatively higher level of magnification—provides the user with a higher-resolution view of the selected region of the object of interest. Indeed, as shown in FIG. 21B, the second level "snapshot" image affords the user a better, more highly-detailed view of the edge of the object of interest, allowing the user to see the edge in higher detail.

FIG. 21C shows the image of FIG. 21B with the addition of a second second level image at the upper right-hand region of the figure. As depicted in the figure, the second second level image affords the user a comparatively high-detail view of the relevant region of the object.

FIG. 21D provides an alternative view in which the user has created a second level image that encompasses the entirety of the object of interest shown in FIG. 21A. As shown in FIG. 21D, the second level image is disposed above the corresponding region of the first level image, thus affording the user a better, more highly-detailed view of the entirety of the object of interest while still showing that object of interest in its original positional context in the first level image. Thus as shown in FIG. 21, the methods include (1) collecting, at a first level of magnification, at least one first level image of a sample; (2) collecting, at a second level of magnification that is greater than the first level of magnification, a first second level image that comprises a region of the corresponding first level image; and (3) overlaying the first second level image on the first level image.

As described elsewhere herein, the disclosed technology may operate so as to overlay the second level image over the first level image such that the field of view in the second level image overlies exactly (or nearly exactly, e.g., within less than about 5%, less than about 1%, or even less than about 0.01% of the width of the second level image) that same field from the first level image. This may be accomplished via a coordinate system, by overlapping/aligning features in the first and second level images, or by other methods known to those in the art. It should be understood that collecting images may be effected by changing objective lenses. For example, collecting a first level image and collecting a second level image may be effected by changing objective lenses. Collecting images may also be effected by changing illumination sources, by changing (or introducing) filters, by changing focal planes, and by otherwise changing observation variables.

In another aspect, the present disclosure also provides sample analysis systems. A system may comprise an imaging device configured to (a) collect first level sample images at a first level of magnification and (b) collect second level sample images at a second level of magnification that is greater than the first level of magnification, a second level sample image comprising a region at least partially disposed within a corresponding first level sample image; a processor configured to effect overlaying the second level sample image on the first level sample image.

The processor may be configured to align (e.g., overlap partially or completely) a feature of at least one collected second level image with the corresponding feature of the first level image that corresponds to that second level image. Suitable alignment techniques are described elsewhere herein.

The processor may, in some embodiments, be configured to overlay the first second level image on the first level image such that the first second level image is positioned according to the region of the first level image that is comprised in the first second level image. This may be accomplished in a variety of ways, e.g., via the coordinate system described above, via an alignment algorithm as described above, or in other ways known to those of skill in the art.

The processor may be configured to collect a second second level image that comprises a region of the corresponding first level image. As described elsewhere herein, second level images may differ from one another in terms of the illumination and/or magnification at which they were collected.

The processor may be configured to align the first second level image and the second second level image such that the aligned first second level image and the second second level images form a contiguous image of a region of the corresponding first level image. Aligning may be at least partially effected by overlapping a region of the first second level image with a region of the second second level image. Alignment may, as described elsewhere herein, be effected in a variety of ways, e.g., by overlapping a region of the first second level image with a region of the second second level image. Alignment may also be effected by overlapping (or nearly overlapping) one or more features of the first and second second level images with one another.

A processor may be configured to overlay the first second level image and the second second level images on the first level image. The processor may be configured to overlay the first second level image and the second second level image on the first level image such that they are positioned relative to one another according to the regions of the first level image that are comprised in the first second level image and the second second level image.

A system may be configured to collect a first level image and a second level image under different illumination conditions. As one example, a first level image may be collected under standard or so-called "white light" illumination, and a second level image of a region of that first level image may be collected under illumination that is optimized to visualize the presence of one or more dyes. A system according to the present disclosure may include an illumination train that is capable of supplying one, two, three, or more different types of illumination.

Systems according to the present disclosure may be configured to select the location of the first level image in an automated fashion. For example, a system may be configured to collect first level images of wells in a well plate by gathering images at regularly-spaced intervals along the plate, the images corresponding to the locations of the wells on the plate.

A system may also be configured to select the location of the first second level image in an automated fashion. This may be accomplished by analyzing the first level image for one or more features of interest, e.g., cells, cell walls, dye molecules, and the like. The system may also be configured to select the location of the first second level image such that the first second level image comprises a feature of interest in the first level image.

A system may be configured to enable a user to, from a view of the first image, select and display the second image. By reference to exemplary FIG. 11, a user might select one of the second level images shown as the smaller rectangular-bordered images within the larger, rectangular first level image.

It should be understood that a system may comprise a first objective lens configured to collect first level sample images and a second objective lens configured to collect second level sample images. A system may be configured to allow a user to change between the first and second objective lenses. Systems may also be configured—as described elsewhere herein—to allow users to change illumination sources, light filters, focal planes, and other variables in addition to changing between two (or more) objective lenses.

The present disclosure additionally provides further methods, the further methods comprising collecting, at a first level of magnification, at least one first sample image (which may also be referred to as a first level image); collecting, at a second level of magnification that is greater than the first level of magnification, at least one second sample image (which may be referred to as a second level image) that comprises a region at least partially disposed within the corresponding first image; aligning a feature of the second image with the corresponding feature of the first image; and overlaying the second image on the first image.

Figure 24:
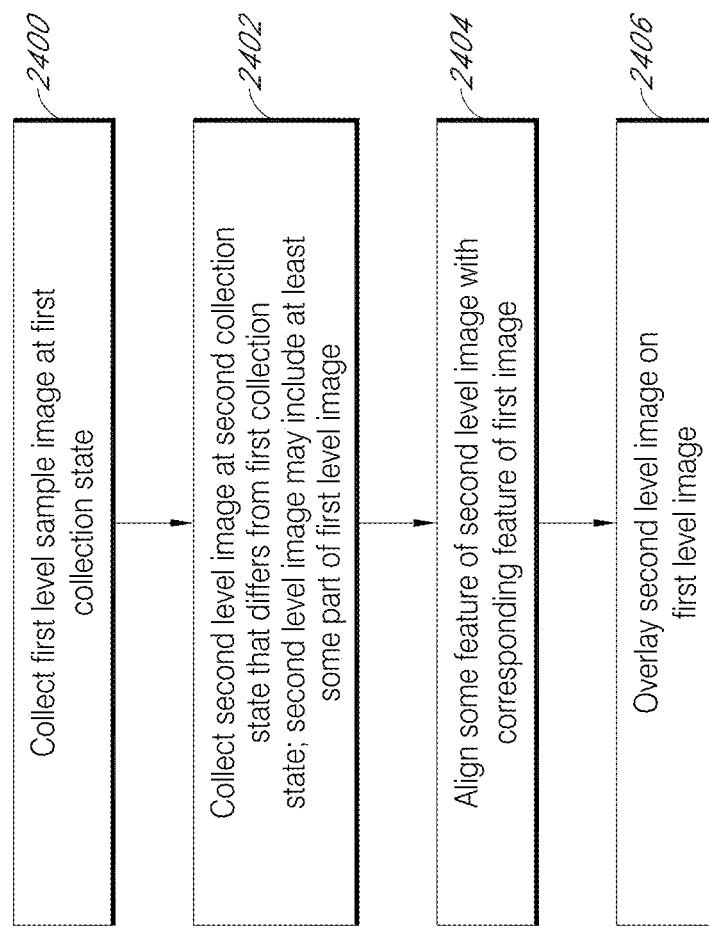
FIG. 24 provides a depiction of exemplary methods according to the present disclosure.

One embodiment is shown in illustrative FIG. 24. As shown in that FIG., the methods include the step 2400 of collecting a first level sample image at a first collection state (e.g., a first level of magnification, a first level of illumination, and the like). The methods may then include the step 2402 of collecting a second level image at a second collection state that differs from the first collection state. As one example, the first level image may be collected at a first level of magnification and the second level image is collected at a second level of magnification that is greater than the first level.

The methods may then include the step 2404 of aligning a feature of the second level image with a corresponding feature of the second level image. As described elsewhere herein, this may include, e.g., aligning a section of cell wall in the second level image with that same section of cell wall in the first level image. This may also include aligning an edge or a region of the second level image with the corresponding edge or region of the first level image.

Step 2406 comprises overlaying the second level image over the first level image. The overlaying may be performed such that the second level image resides directly over the region of the first image from where the second image was taken. This may be done to preserve the alignment of the second level image over the first level image, as described above.

The disclosed methods may comprise collecting a third sample image (e.g., a second second level image) that comprises a region at least partially disposed within the first image. The collection of the second image, the collection of the third image, or both, may be performed in an automated fashion, but may also be performed manually.

The methods may also comprise overlaying the third image over the first image and aligning a feature of the third image with the corresponding feature of the first image.

In some embodiments, the methods may comprise overlaying the third image over the second image and aligning a feature of the third image with the corresponding feature of the second image. The methods may also comprise overlaying (or otherwise aligning) the third image relative to the first image.

The methods may also comprise defining the border of the first, second, or both images. The border may be defined via selection of a pre-set border (e.g., from a drop-down menu). The border may be square, rectangular, circular, ovoid, polygonal, or even custom in shape.

In some embodiments, (a) at least one or more first images is based on information taken at two or more focal planes, (b) wherein at least one or more second images is based on information taken at two or more focal planes, or both (a) and (b). As one example, a first (and/or second) image may be developed as a composite of images of a sample taken at two or more different focal planes. Alternatively, a first (and/or second) image may be developed as a composite of images of a sample taken under two or more different illuminations.

Alignment of images and image overlay may be effected in manual or automated fashions. As described elsewhere herein, the methods may also allow a user to, from a view of the first image, select and display the second image. It should be understood that collecting images may be effected by changing objective lenses. For example, collecting a first level image and collecting a second level image may be effected by changing objective lenses. Collecting images may also be effected by changing illumination sources, by changing (or introducing) filters, by changing focal planes, and by otherwise changing observation variables.

Also provided are methods of image analysis. The methods comprise collecting, at a first level of magnification, a plurality of first sample images; for each member of a set of at least some of the plurality of first images, collecting at a second level of magnification greater than the first level of magnification one or more second sample images that comprises a region at least partially disposed within that corresponding first image; for at least some of (or even for each of) those members of the set of first images, aligning a feature of each of the one or more second images with the corresponding feature of that corresponding first image; and overlaying the one or more second images on the corresponding first image.

In some embodiments, one or more second sample images from within two or more first images are taken at the same relative positions within the respective first images. As one example, in a process in which the centers of wells on a well plate serve as first images, second images are taken at the center of the uppermost edge of each well first image.

Collecting the plurality of first images, collecting the second images, or both, may be effected in an automated fashion. A user may set the location of image collection, e.g., by specifying an even spacing between images using a coordinate system or other reference.

In some embodiments, (a) at least one or more first images is based on information taken at two or more focal planes, (b) wherein at least one or more second images is based on information taken at two or more focal planes, or both (a) and (b). As one example, a first (and/or second) image may be developed as a composite of images of a sample taken at two or more different focal planes. Alternatively, a first (and/or second) image may be developed as a composite of images of a sample taken under two or more different illuminations.

Figure 25:
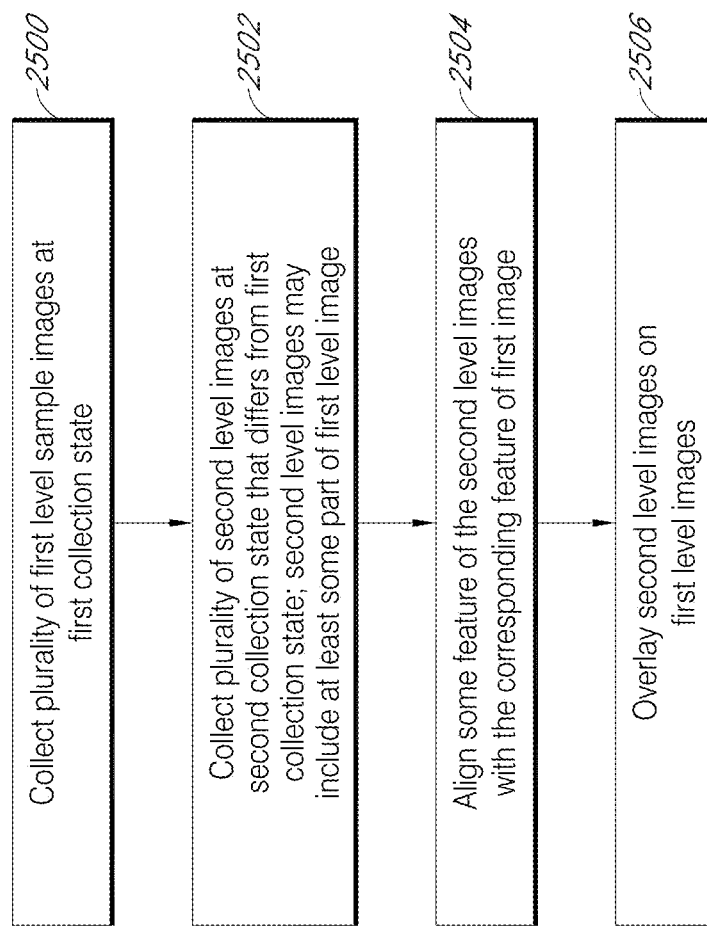
FIG. 25 provides a depiction of alternative exemplary methods according to the present disclosure.

FIG. 25 provides illustrative methods as described herein. As shown, the methods may include the step 2500 of collecting plurality of first level sample images at a first collection state. As one example, this might include collecting, for at least some of (or even for each of) the 96 wells in a sample plate, an image of the center of the well, with each of these images being taken at a first level of magnification.

In step 2502, the methods may include collecting a plurality of second level images at second collection state that differs from first collection state. As examples, the second level images may be taken at a higher magnification than the corresponding first level images, or may be taken under illumination conditions that differ from the corresponding first level images. A second level image may include at least some part of the first level image, e.g., a higher-magnification view of the most central portion of the corresponding first level image.

In step 2504, the methods may include aligning at least some feature of a second level image with the corresponding feature of the corresponding first image. In the 96 well plate example given above, this might include, for example, centering the center of a second level image over the center of the first level image that corresponds to that second level image. As one example, if for every well of a 96 well plate first level images were taken of the center of each well and second level images were taken of the center of those same wells but at a higher magnification, the centers of the second level images might be aligned with the centers of the first level images, this affording the user affords the user a more highly-detailed view of the center of the well, allowing the user to see the well's center in higher detail. It should be understood that collecting images may be effected by changing objective lenses. For example, collecting a first level image and collecting a second level image may be effected by changing objective lenses. Collecting images may also be effected by changing illumination sources, by changing (or introducing) filters, by changing focal planes, and by otherwise changing observation variables.

The present disclosure also provides sample analysis systems, comprising: an imaging device configured to (a) collect first sample images at a first level of magnification and (b) collect second sample images at a second level of magnification that is greater than the first level of magnification, a second sample image comprising a region at least partially disposed within a corresponding first image; a processor configured to effect (a) aligning a feature of at least one collected second image with the corresponding feature of the first image that corresponds to that second image and (b) overlaying the second image on the first image.

A system may be configured to effect collecting the one or more first images, collecting the second images, or both, in an automated fashion. A system may also be configured to give use to one or more first images by combining information taken at two or more focal planes, wherein the system is configured to give use to one or more first images by combining information taken at two or more focal planes, or both.

In some embodiments, a system is configured such that one or more second images from within two or more first images are taken at the same relative positions within the respective first images.

A variety of imaging devices are considered suitable for the disclosed methods and systems. Exemplary such devices include, e.g., microscopes, plate readers, array scanners, and high-content screening devices. Some illustrative examples are the Thermo Fisher CX5™, CX7™, and EVOS™ systems.

As described elsewhere herein, a system may be configured to enable a user to, from a view of the first image, select and display the second image.

It should be understood that a system may comprise a first objective lens configured to collect first level sample images and a second objective lens configured to collect second level sample images. A system may be configured to allow a user to change between the first and second objective lenses. Systems may also be configured—as described elsewhere herein—to allow users to change illumination sources, light filters, focal planes, and other variables in addition to changing between two (or more) objective lenses.

Exemplary Embodiments

Figure 1:
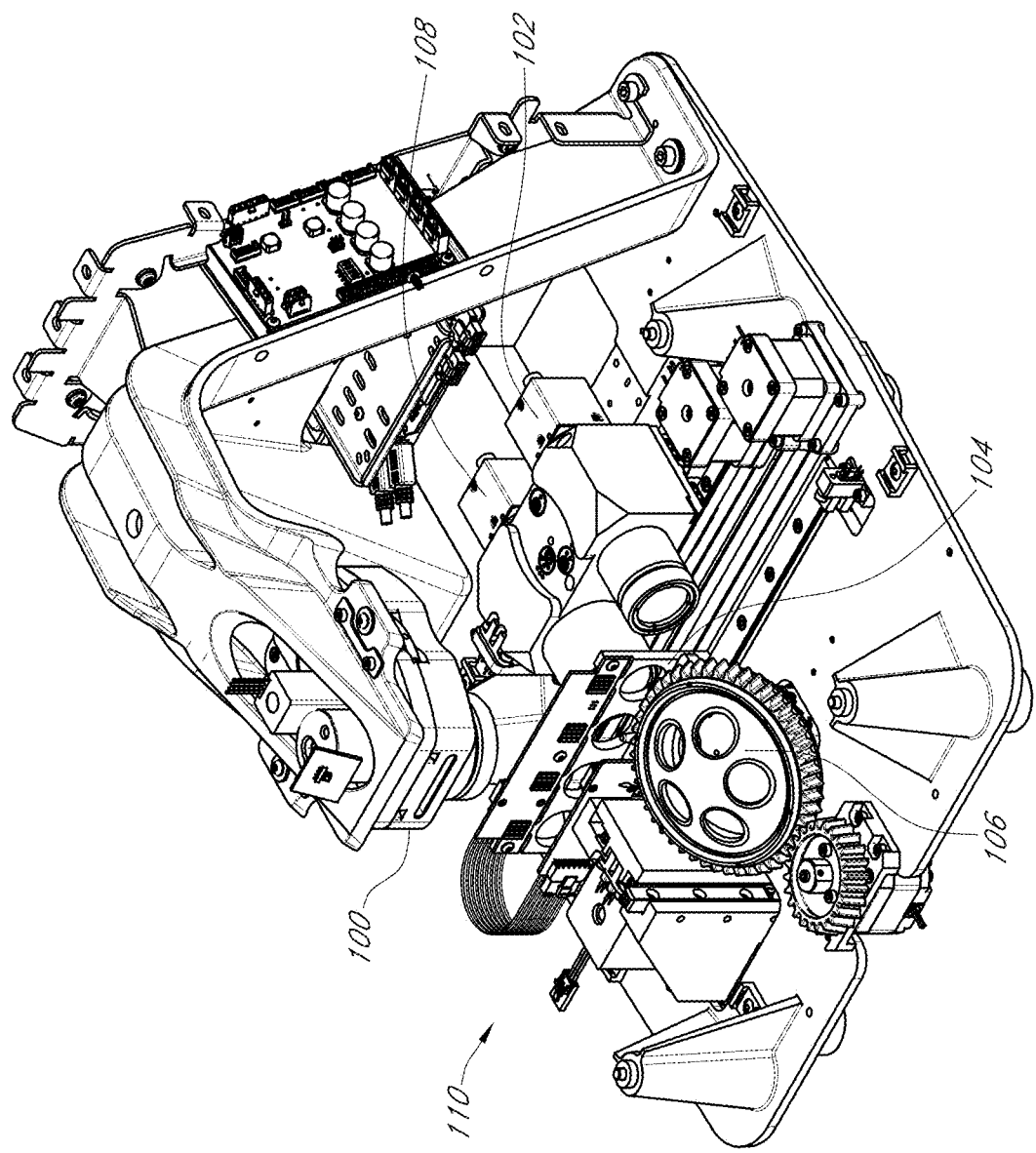
FIG. 1 provides a component view of an exemplary two-camera device suitable for the present disclosure.

FIG. 1 provides a component view of an exemplary device 108 (e.g., the EVOS™ line of devices by Thermo Fisher) according to the present disclosure. As shown in the FIG., the device may include transmitted light condenser 100. The condenser may include an automated turret with multiple phase annuli. The device may also include monochromatic camera 102 and color camera 108. An illumination source 104, such as light cubes (e.g., Thermo Fisher EVOS™ light cubes), may be installed on the translating carriage; the position of the carriage may be automated to provide illumination of sample 110. Various objective lenses may be disposed in turret 106, which turret may be automated or manual and an objective may be selected by the user depending on the level of desired magnification.

Figure 2A:
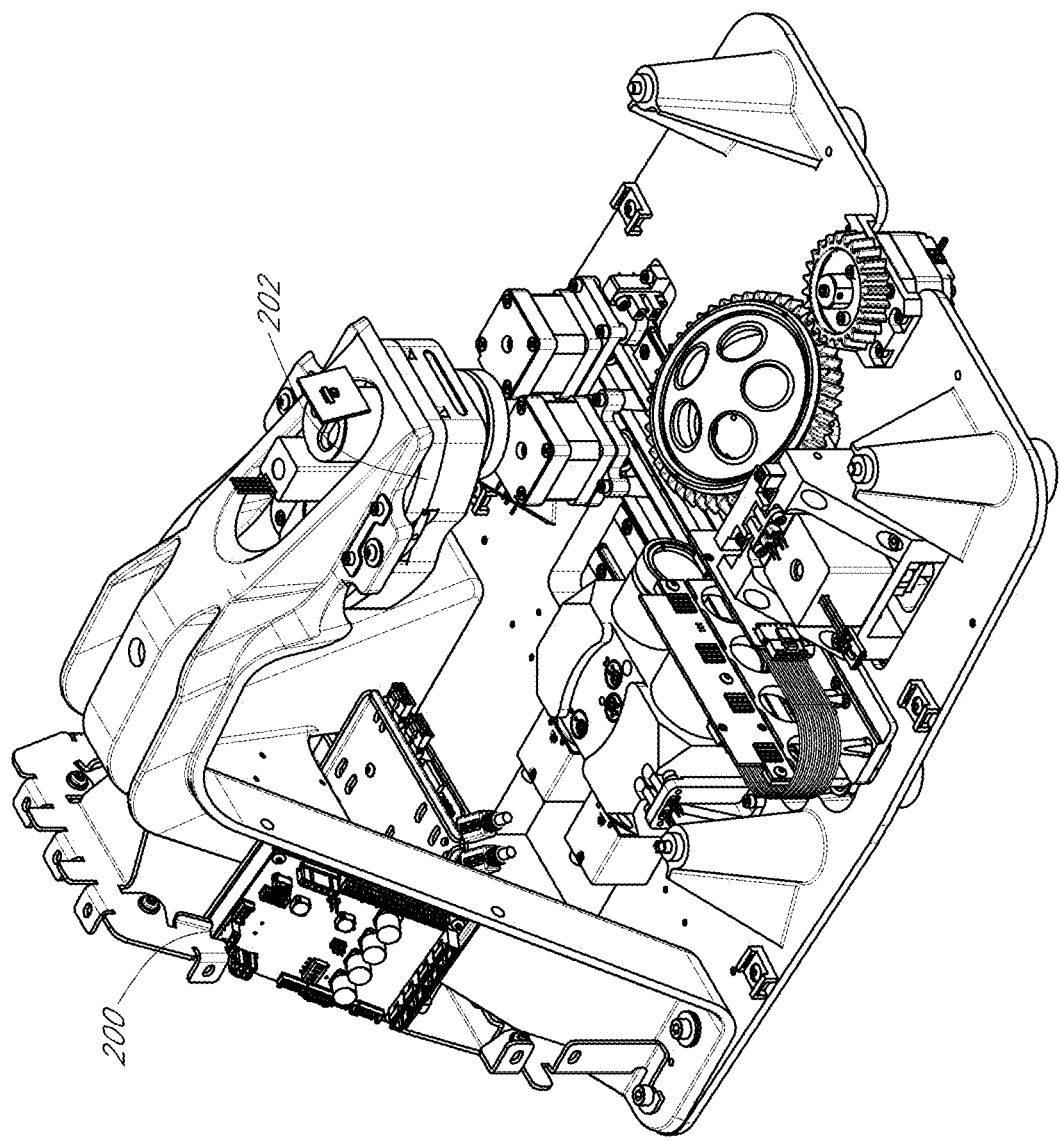
FIG. 2A provides a component view of the exemplary device of FIG. 1 without the stage, FIG. 2B provides an alternative component view of the device of FIG. 2A, and FIG. 2C provides a side view of the device of FIG. 1.
Figure 2B:
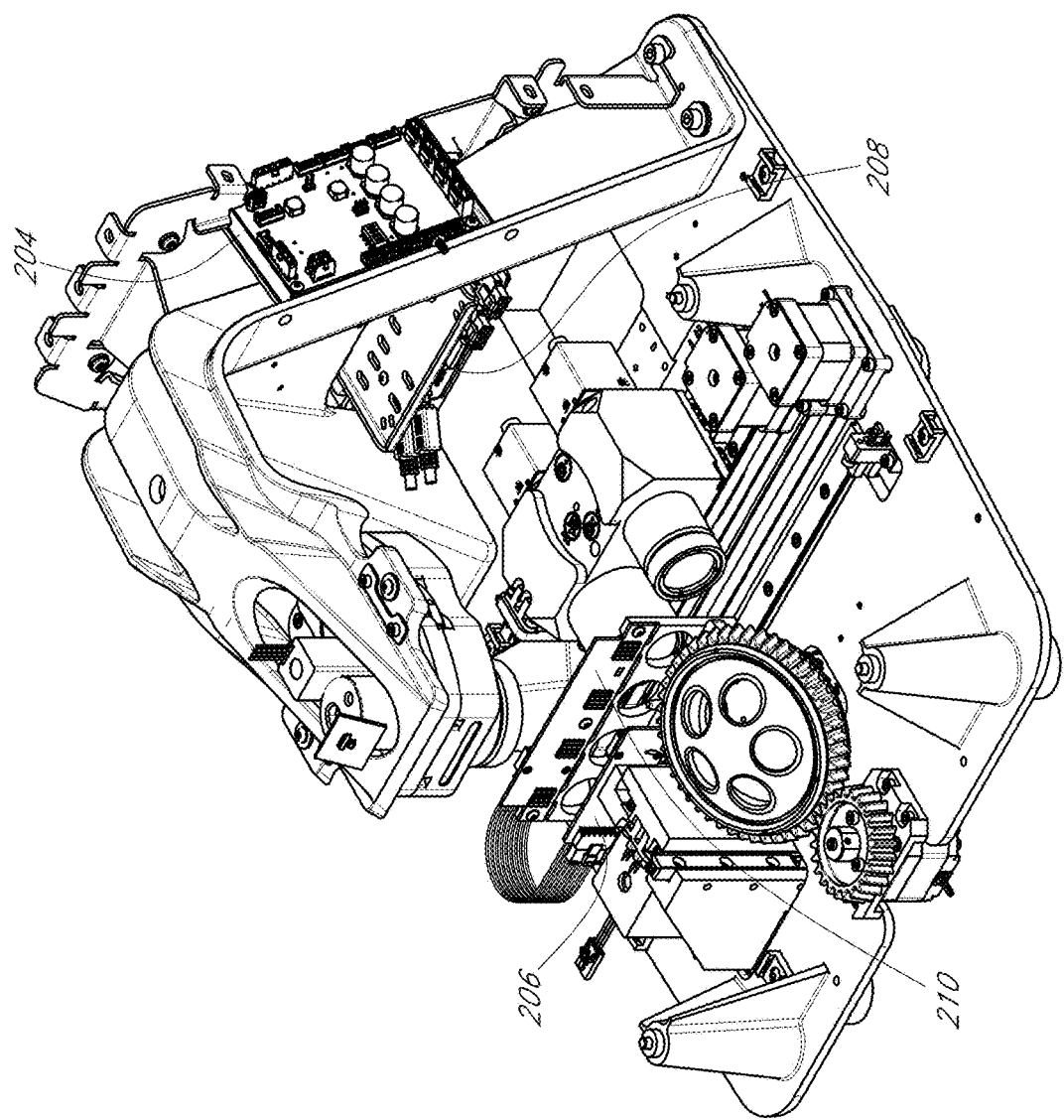
Figure 2C:
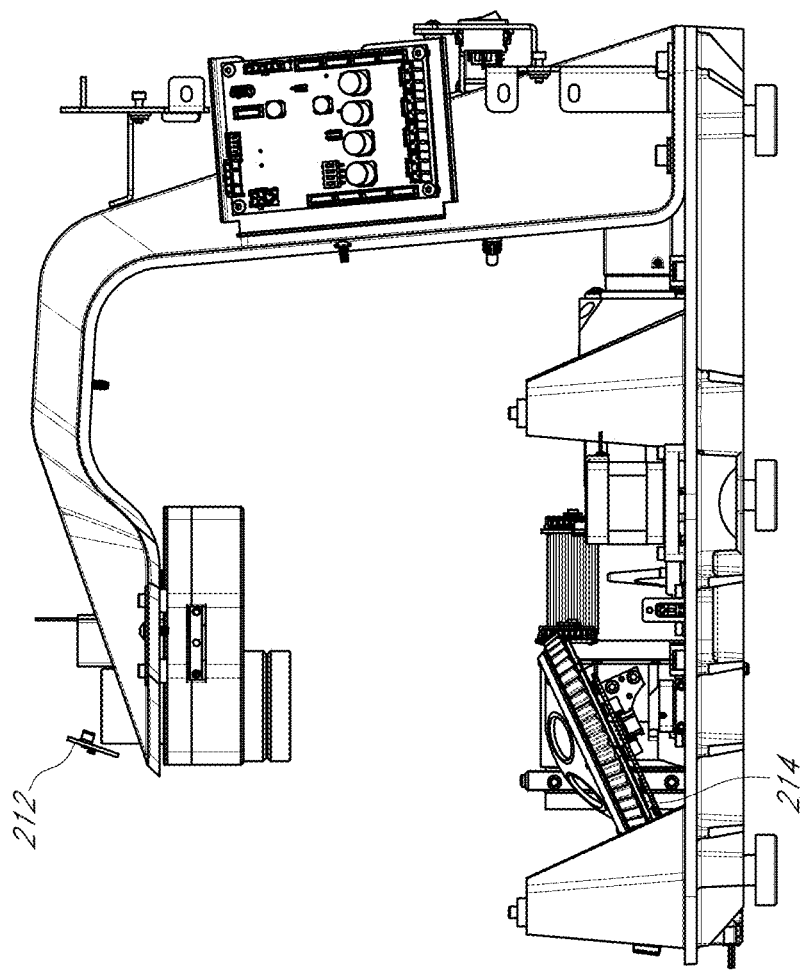

FIG. 2A provides an alternative view of the device of FIG. 1. As shown in FIG. 2, motor and light controller 200 is configured to control the stage (not shown). The device may also include a phase turret Hall effect device 202. FIG. 2B shows a second motor and light controller 204, as well as light cube power and signal 206 and power and signal hub 208. The device may also include a light cube interface board 210. Status LED 212 is shown in FIG. 2C, and objective turret Hall effect 214 is also shown in FIG. 2C.

Figure 3A:
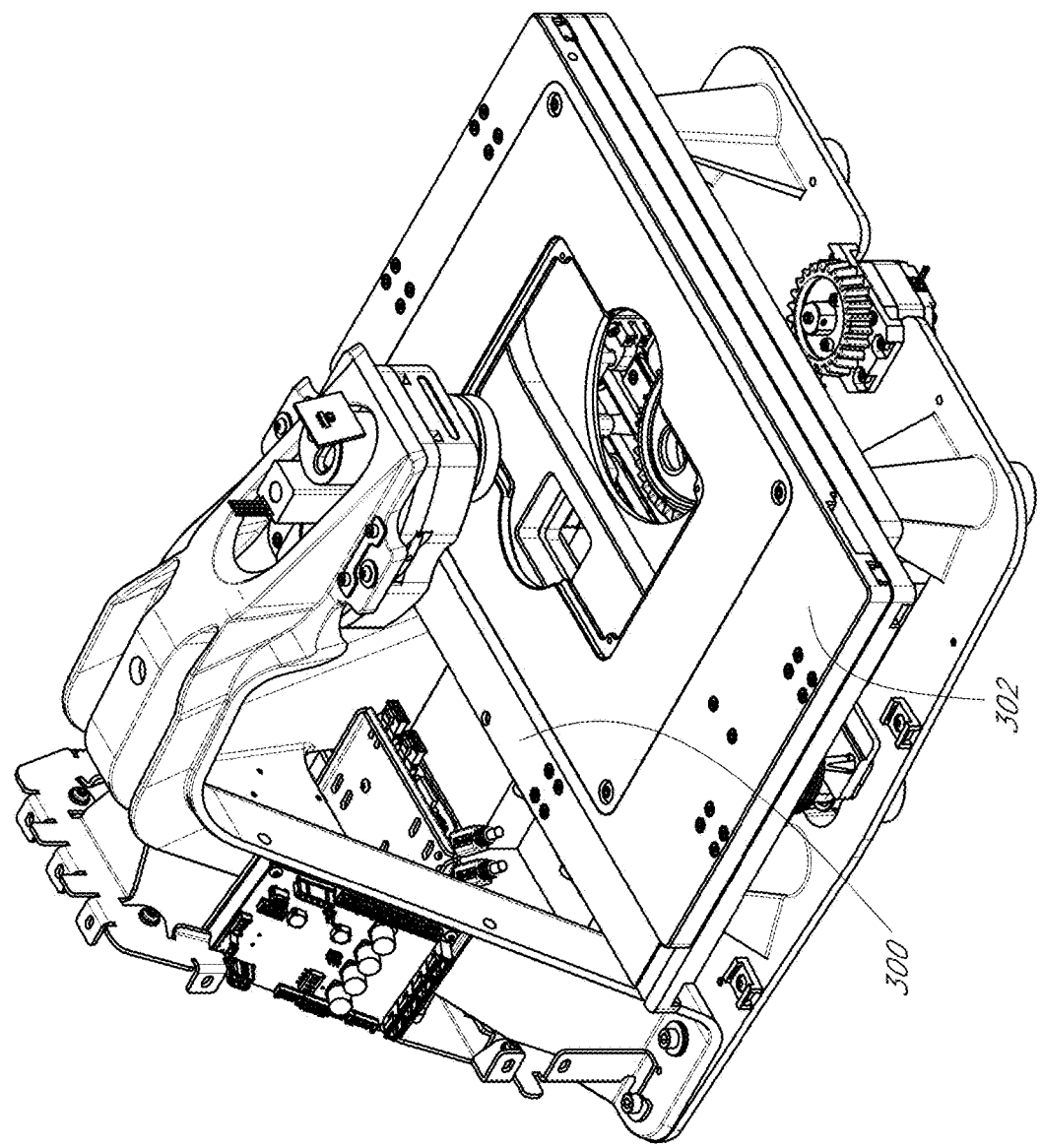
FIG. 3A provides a component view of the exemplary device of FIG. 1 showing the stage, FIG. 3B provides an alternative component view of the device of FIG. 3A, and FIG. 3C provides a side view of the device of FIG. 1.
Figure 3B:
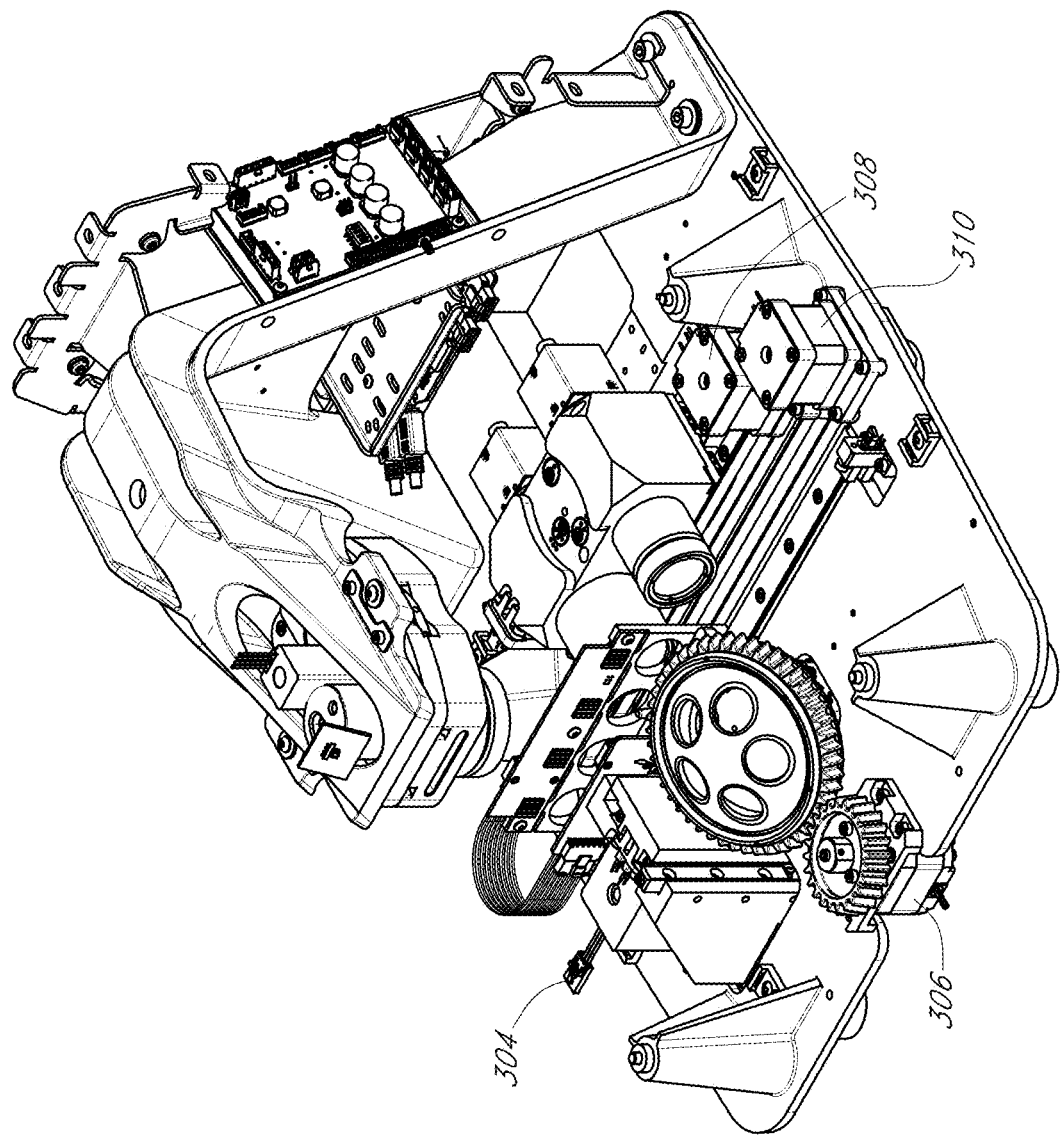
Figure 3C:
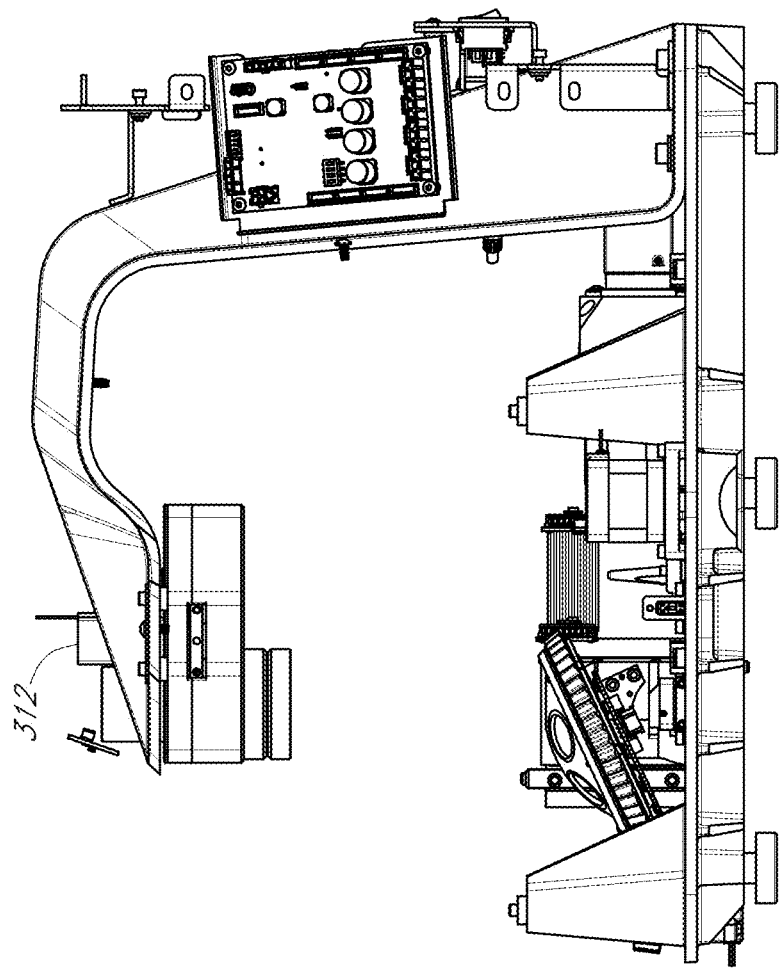

FIG. 3A, FIG. 3B, and FIG. 3C provide a view of the stage of the device of FIG. 1. As shown in FIG. 3A, the stage may include x-axis motor 300 (inside stage) and y-axis motor 302 (inside stage). Z-axis motor 1 304 is shown in FIG. 3B, and z-axis motor 2 306 is also shown in that figure.

Camera axis motor 308 is shown in that figure, as is epi axis motor 310. FIG. 3C provides a side view in which phase turret motor 312 is shown.

Figure 4:
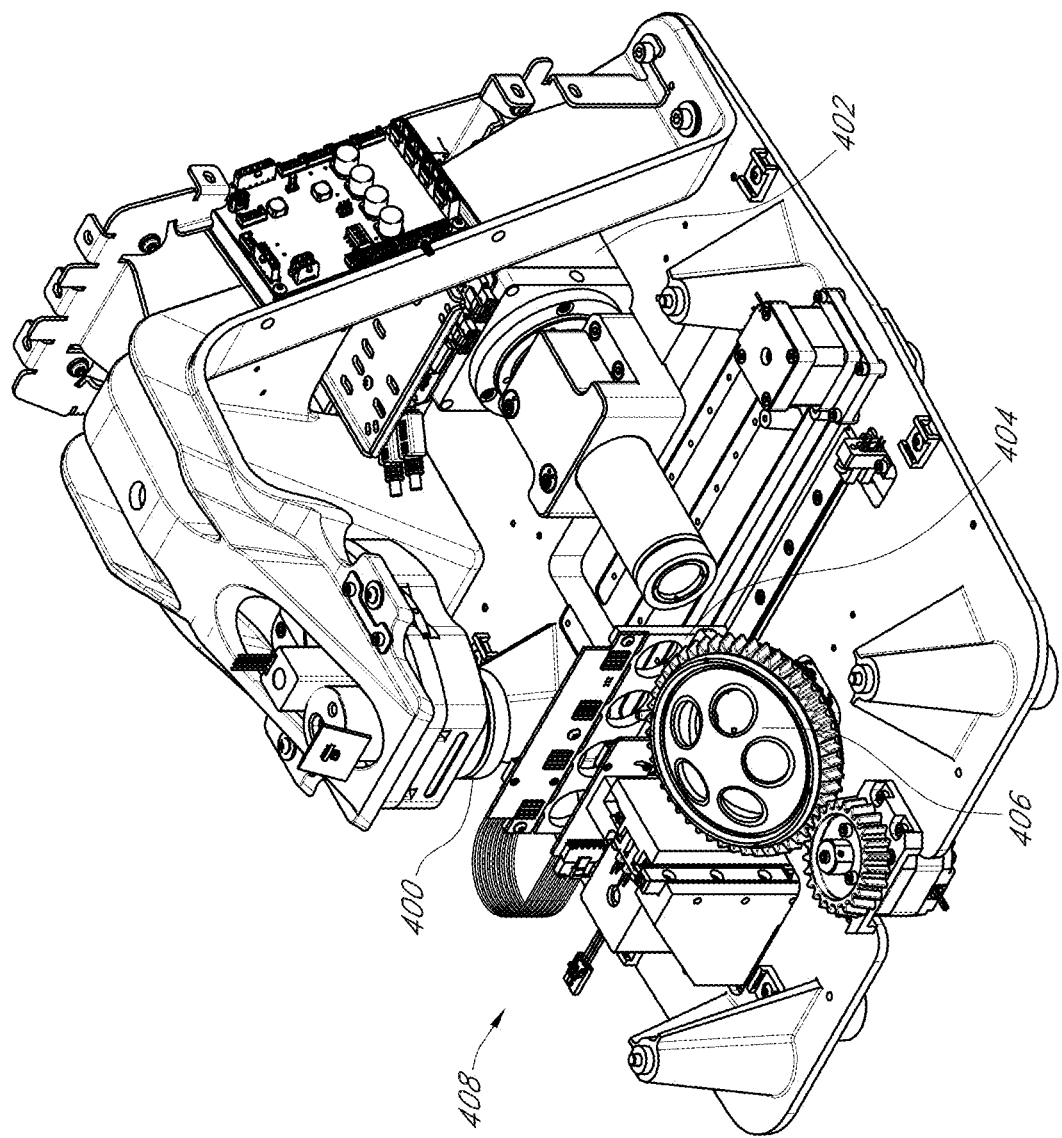
FIG. 4 provides a component view of an exemplary single-camera device suitable for the present disclosure.

FIG. 4 provides a view of a single-camera device according to the present disclosure. As shown in the figure, the device may include transmitted light condenser 400 and monochrome camera 402, which camera may be fixed in place. Light cubes 404 provide sample illumination, and the device may feature multiple objective lenses 406 for sample 408.

Figure 5A:
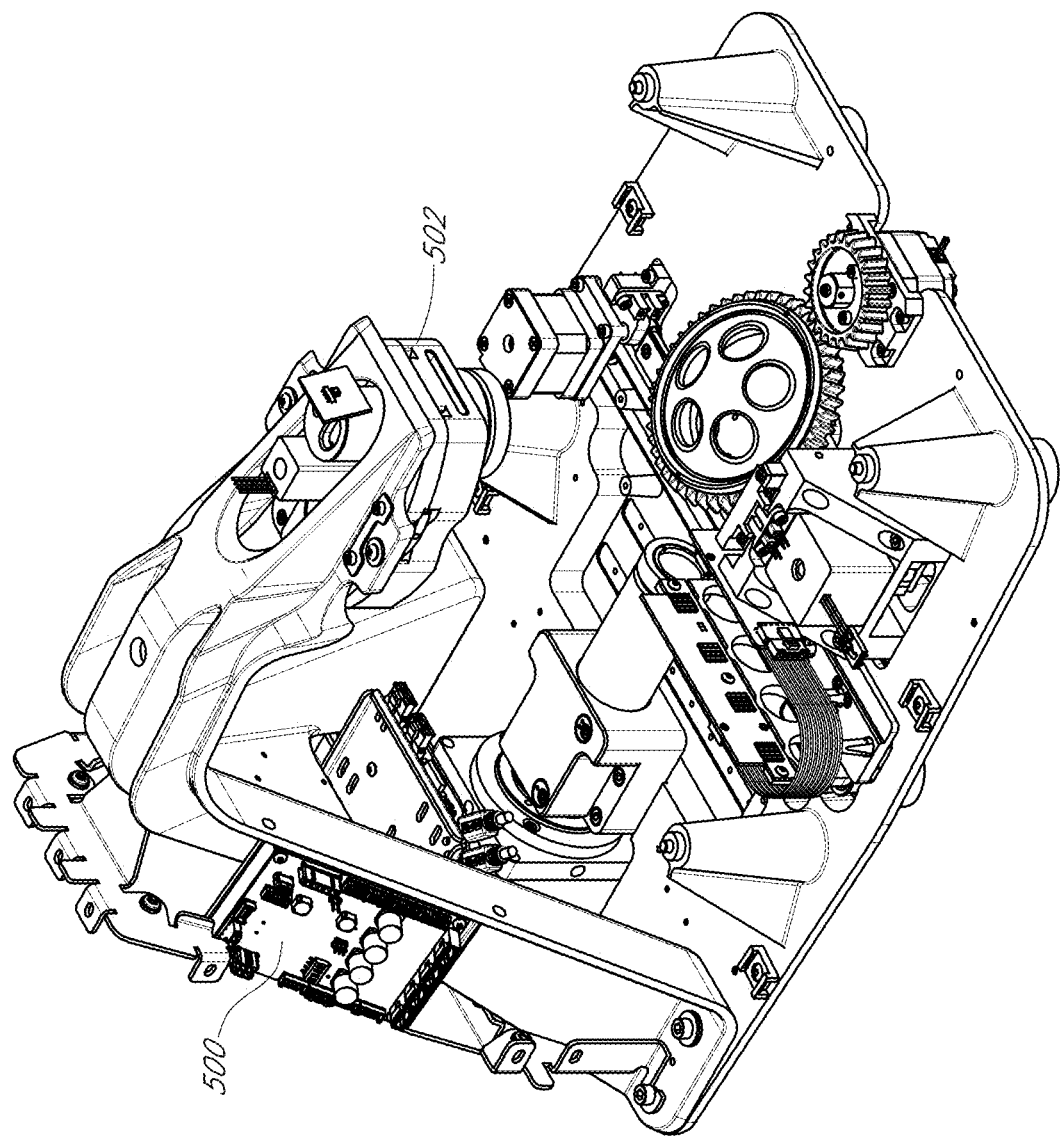
FIG. 5A provides a component view of the exemplary device of FIG. 4 showing the stage, FIG. 5B provides an alternative component view of the device of FIG. 5A, and FIG. 5C provides a side view of the device of FIG. 4.
Figure 5B:
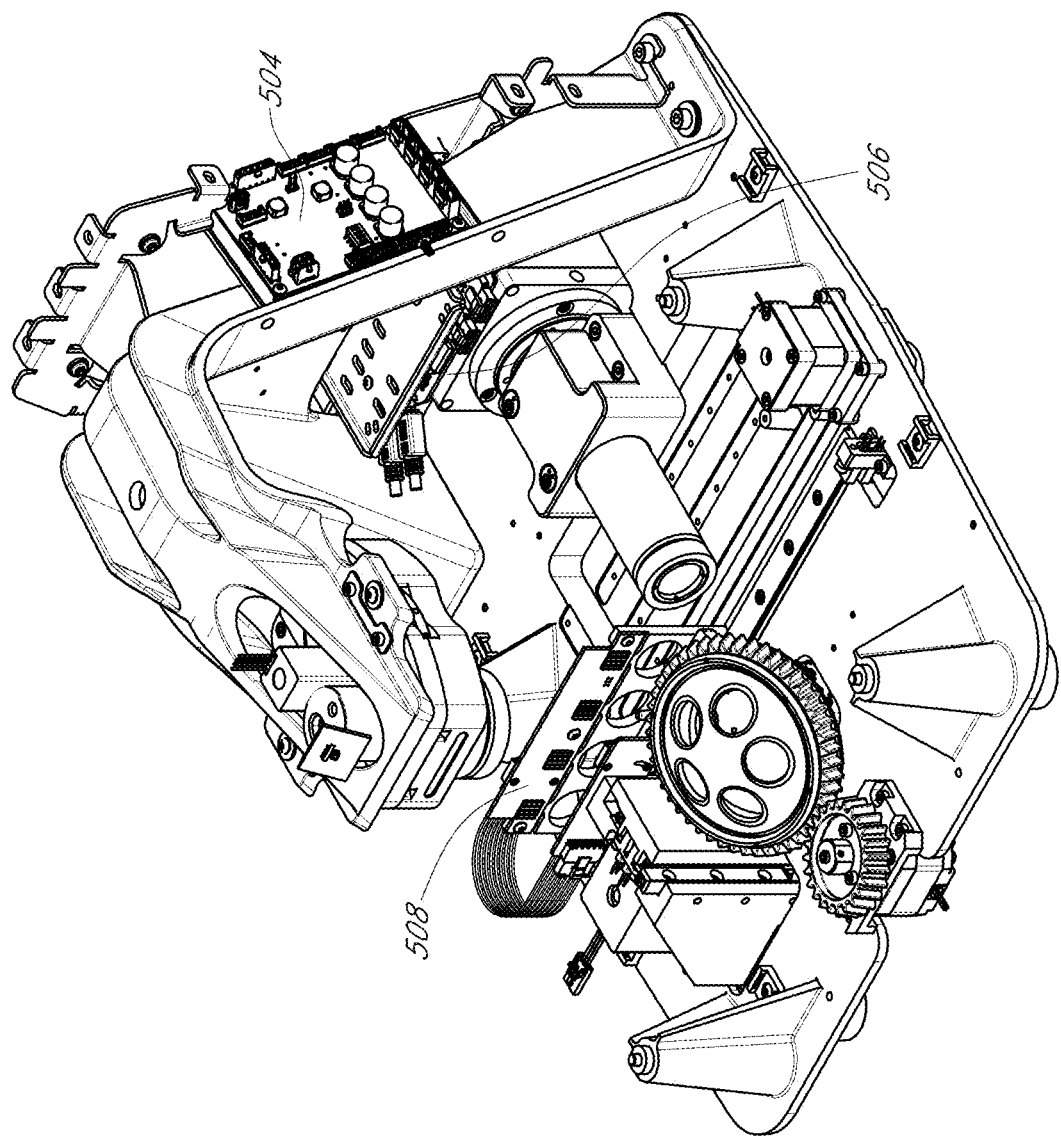
Figure 5C:
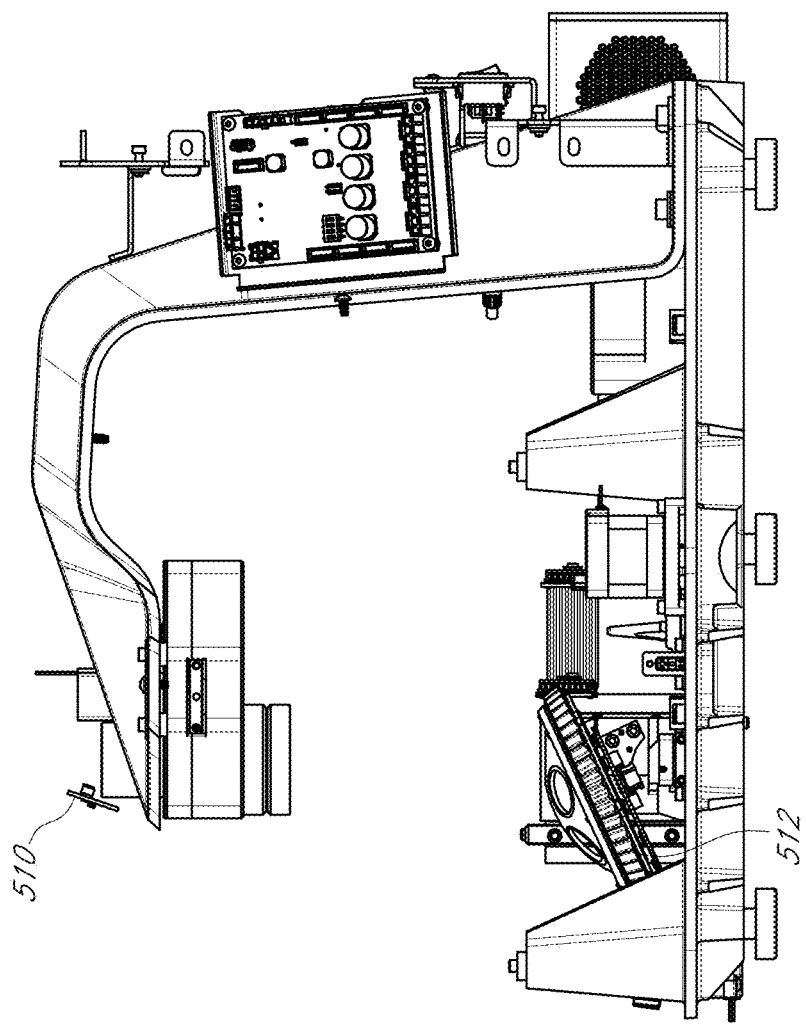

FIGS. 5A and 5B provide a component view of the device of FIG. 4. As shown in FIG. 5A, the device may suitably include motor and light controller 1 500 and phase turret Hall effect 502. FIG. 5B depicts motor and light controller 2 504, power and signal hub 506, and cube power and interface adapter 508. Also present may be a cube interface board. The device may include a status LED 510 and also an objective turret Hall effect 512.

Figure 6A:
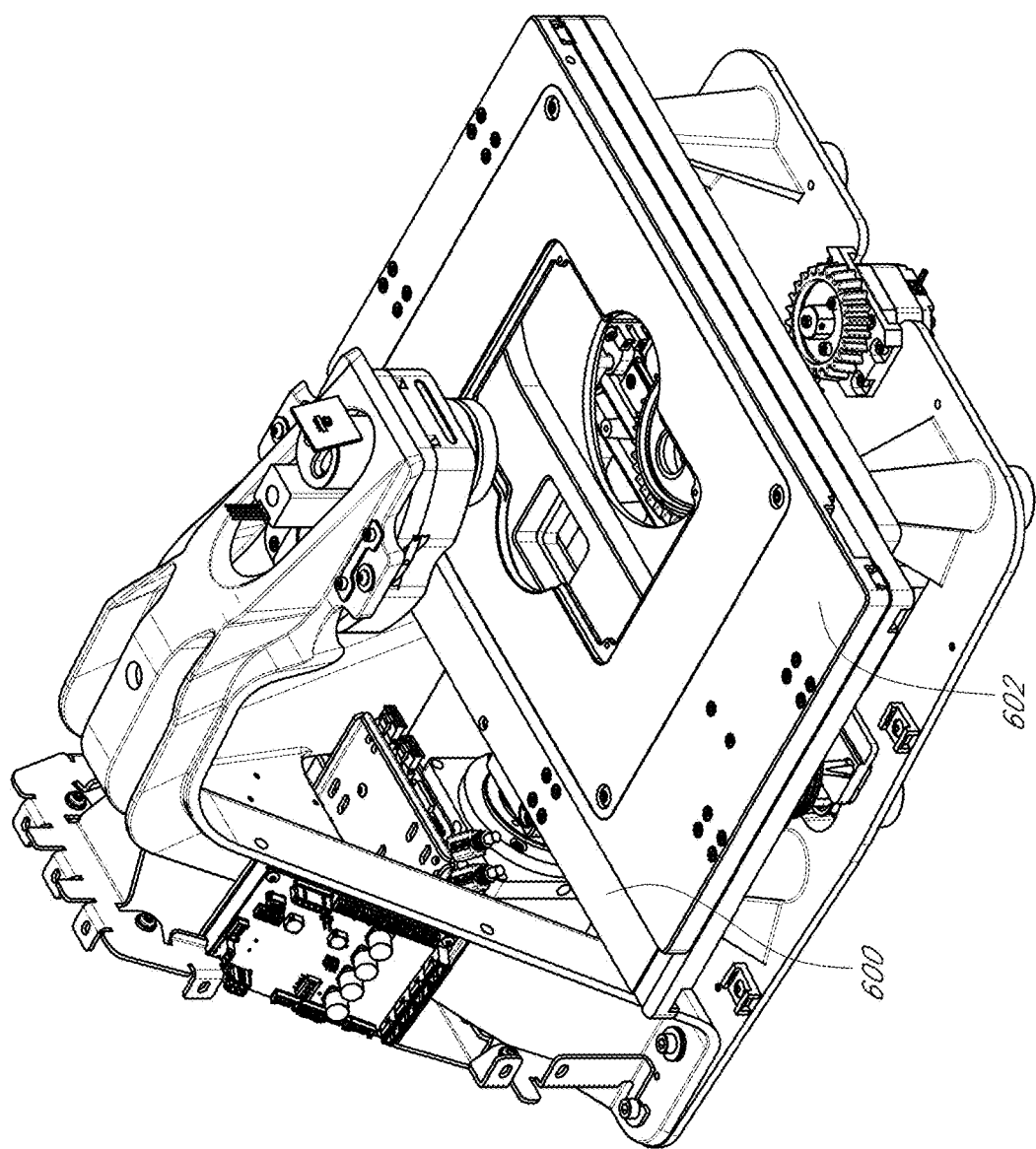
FIG. 6A provides a view of the device of FIG. 4 showing the stage, FIG. 6B provides a view of the interior components of the device, and FIG. 6C provides a side component view of the device.
Figure 6B:
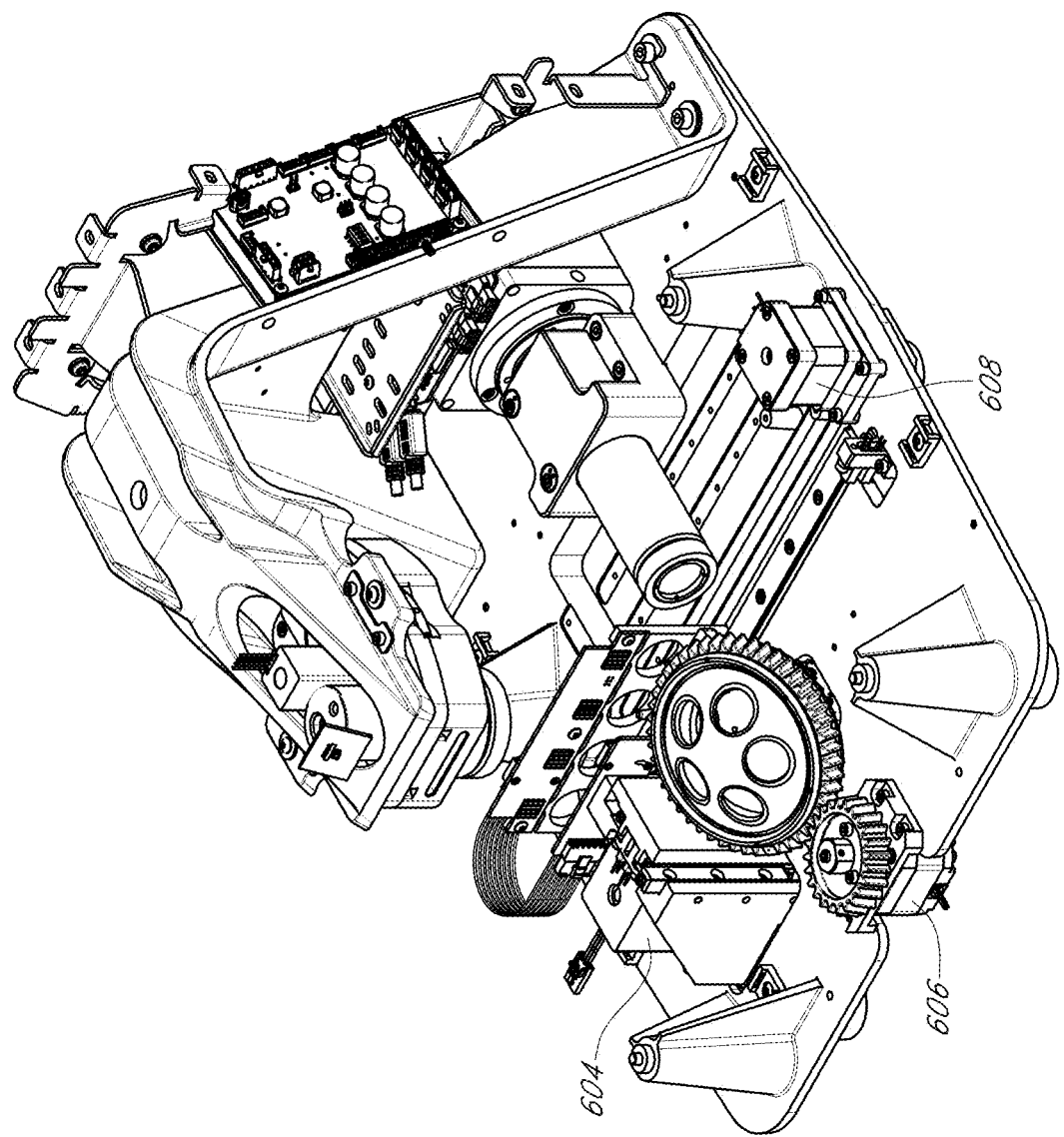
Figure 6C:
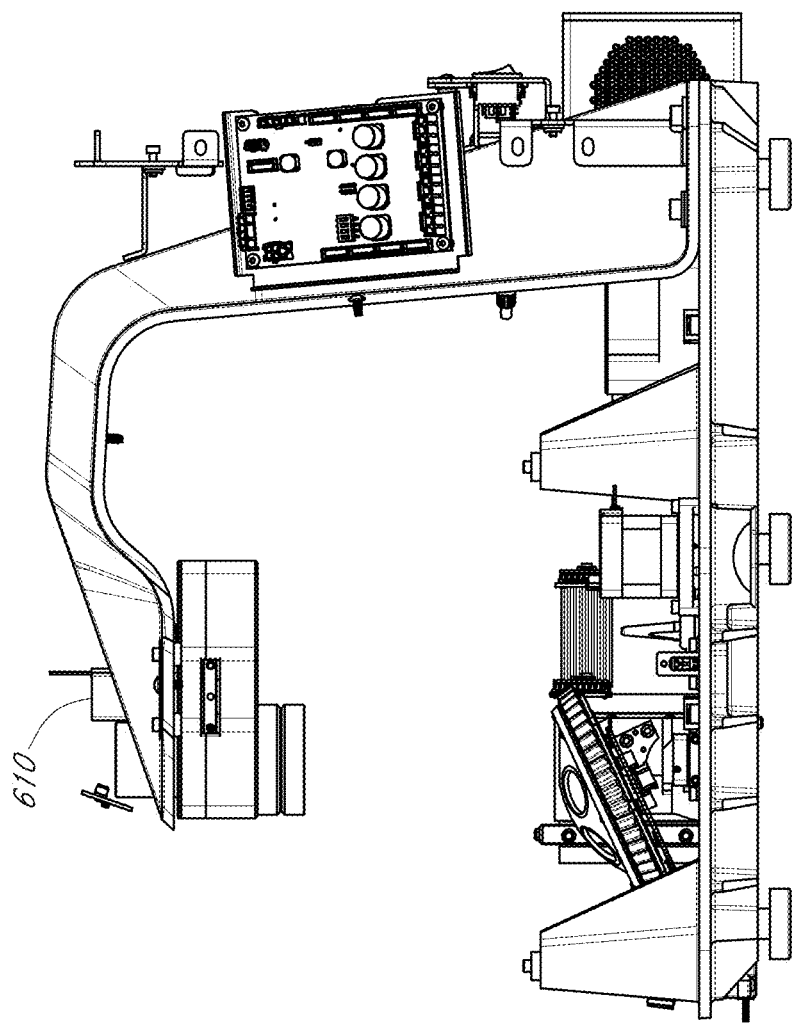

FIG. 6A provides detail of the stage arrangement of the device in FIG. 4. As shown in FIG. 6A, the stage may feature x-axis motor 600 (inside stage) and y-axis motor 602 (inside stage). FIG. 6B depicts z-axis motor 604 as well as objective axis turret motor 606 and epi axis motor 608. FIG. 6C provides a side component view, with phase turret motor 610.

Figure 7:
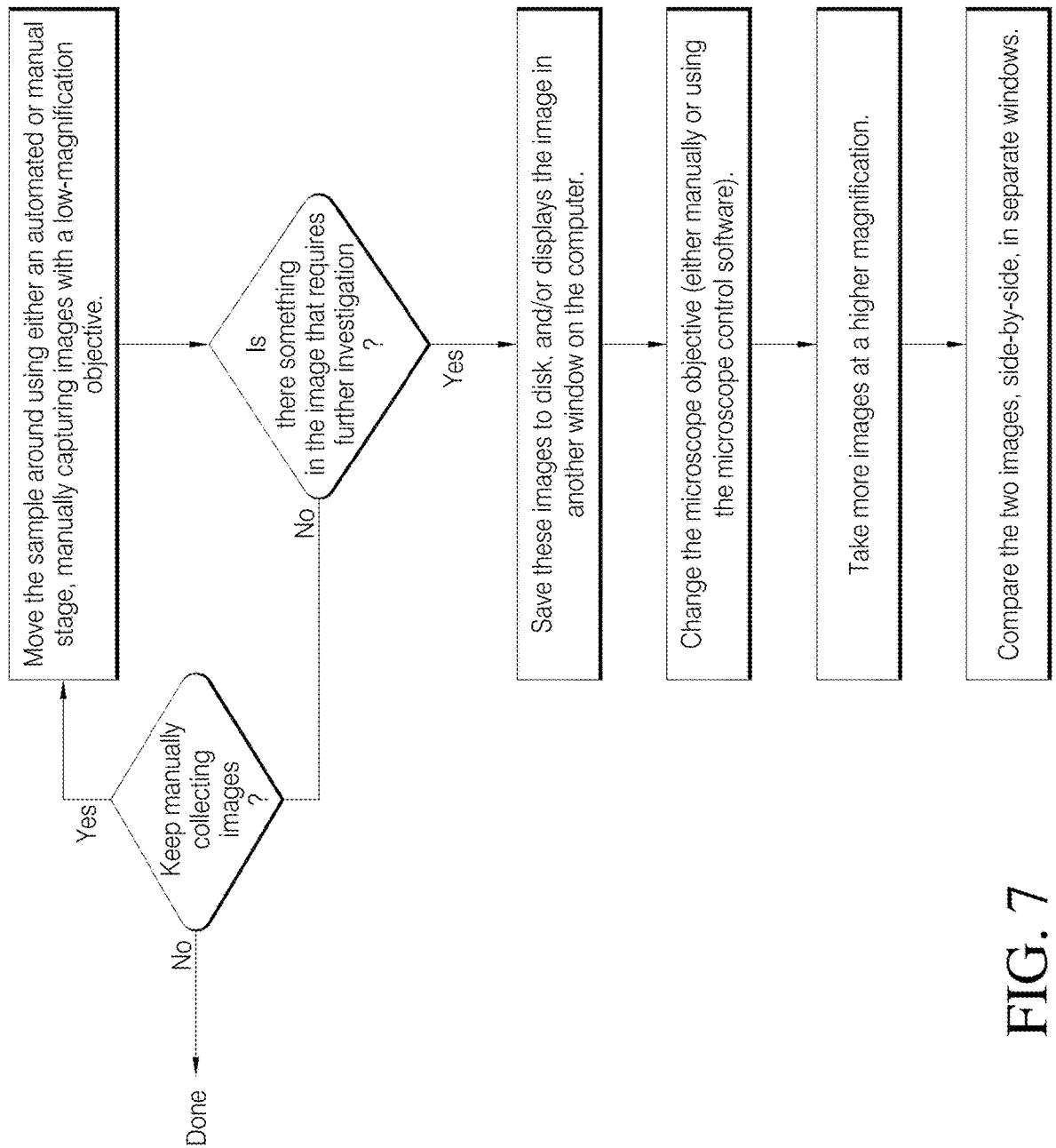
FIG. 7 provides an exemplary information flow diagram for existing manual methods.

FIG. 7 presents a typical information flow for traditional methods of manually examining areas of interest with a standard microscope. As is familiar to those of skill in the art, a user may move a sample around using a manual or automated stage, manually capturing images with a low-power objective lens. If the user identifies some feature of the images that warrants further investigation, the user may save that image to disk or other medium. The user may then take a higher-magnification image of the area of interest using a different objective lens and then compare the low- and high-magnification images. This process is well-known in the art and is tedious and time-consuming, as it requires a significant amount of involvement and record-keeping on the part of the user. In addition, it is difficult, when using existing processes, to re-create the image collection scheme, as a user may not know from precisely where in a low-magnification image the high-magnification images were taken.

Figure 8:
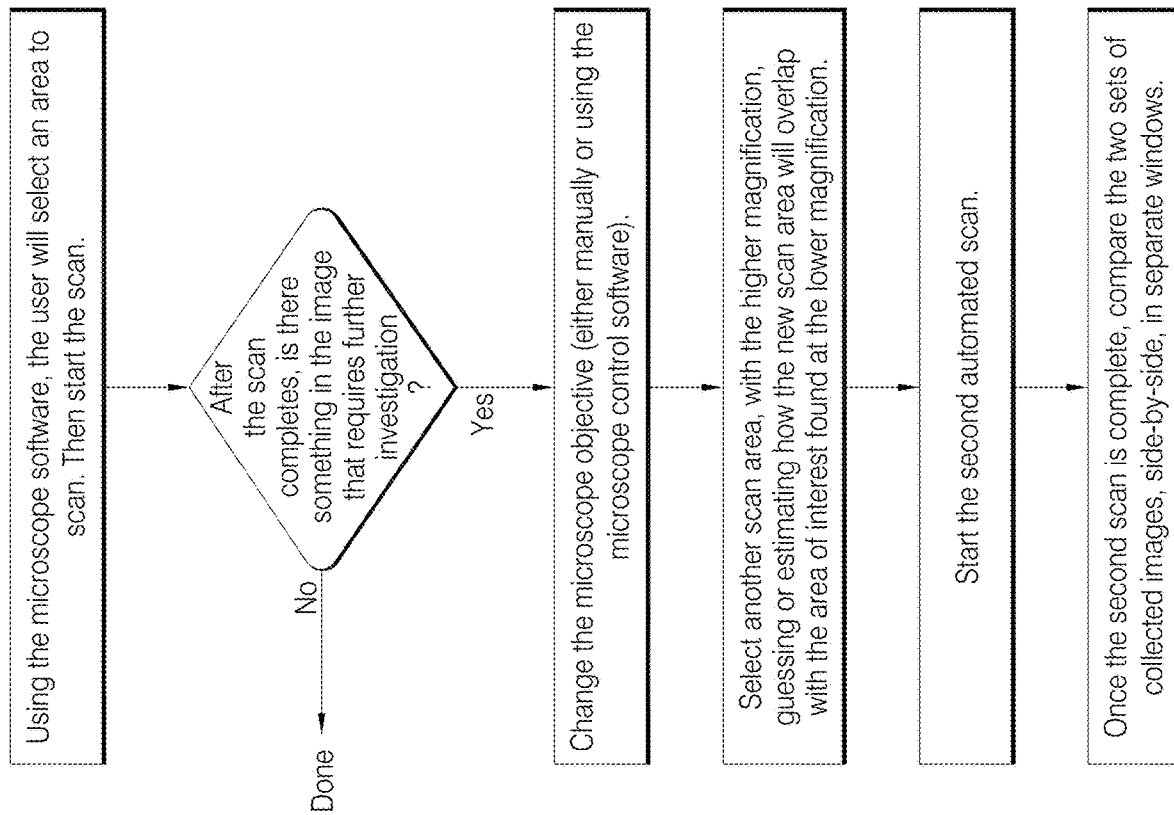
FIG. 8 provides an exemplary information flow diagram for existing automated methods.

FIG. 8 provides a typical information flow for traditional methods of examining areas of interest in an automated fashion. As shown in the figure, a user identifies a sample region of interest and then engages a software program to scan that region of interest. If the user identifies an area of interest, the user then switches to a higher-magnification objective lens and—after estimating the overlap between a scan of that new area of interest and the original area scanned at the lower magnification—starts a second automated scan. After that second scan is complete, the user compares the two sets of collected images in separate windows. This process is also time-consuming and tedious. Further, a user may not know from precisely where in a low-magnification image the high-magnification images were taken.

Figure 9:
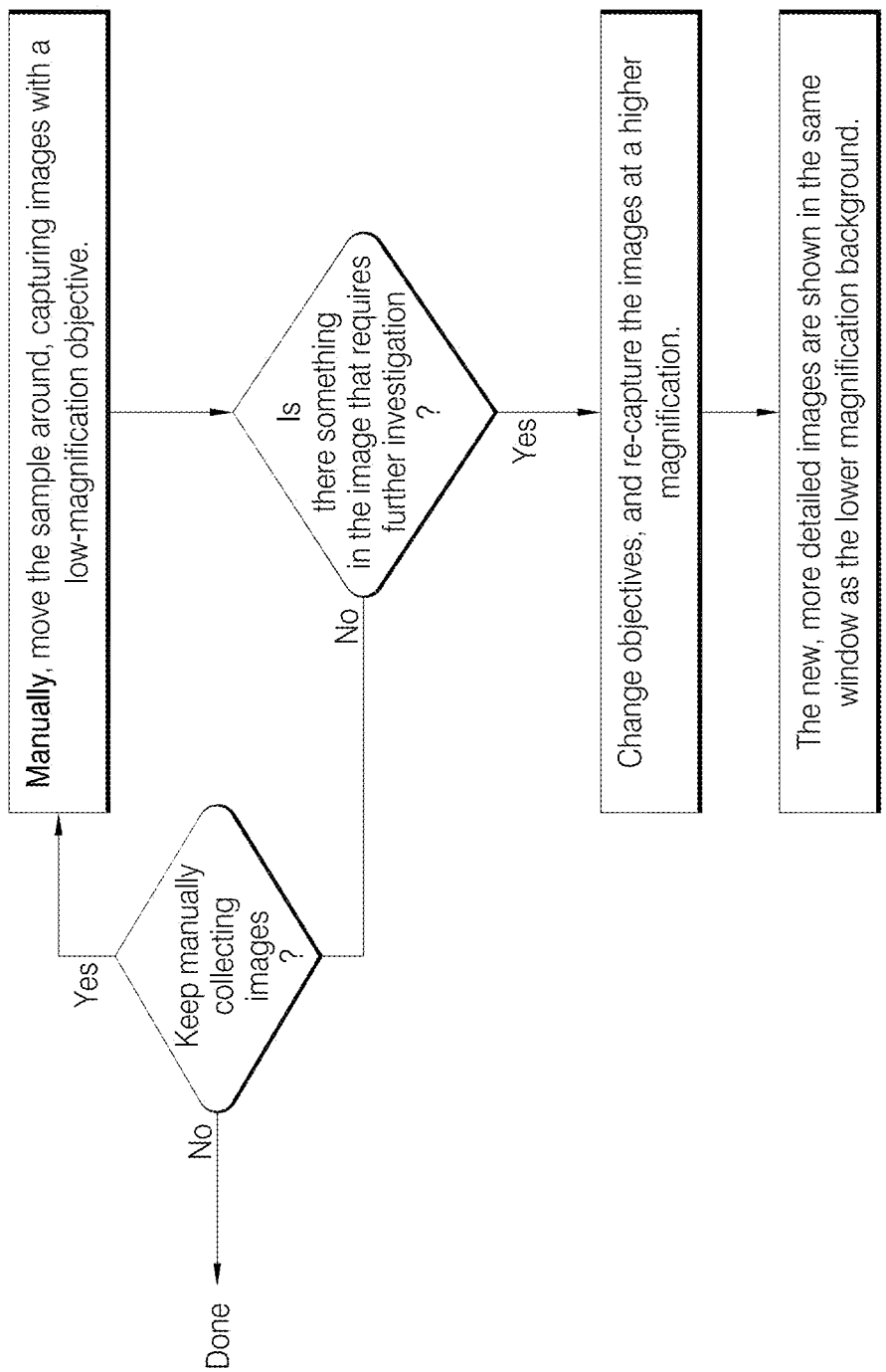
FIG. 9 provides an exemplary information flow diagram for a manual embodiment of the disclosed methods.

FIG. 9 provides a typical information flow for the disclosed methods of examining areas of interest in a manual fashion. As shown in the figure, a user performs a low-magnification review of a sample, e.g., via moving the sample around. After the user identifies an area of interest within that low-magnification image, the user may change to a higher-magnification objective lens and then capture a higher-magnification image of the area of interest. This new, more detailed image may then be shown in the same window as the lower magnification background images, as shown in exemplary FIG. 11. This approach in turns allows for the user to view the higher-magnification images in spatial context; i.e., the higher-magnification image may be overlaid on the lower-magnification background image such that the higher-magnification image is disposed over the region of the background image from where the higher-magnification image was collected.

The higher-magnification image may also be displayed in a way such that a user may select (e.g., via clicking on or via positioning a cursor or other pointer) that image for further magnification. In this way, a user can quickly scan through a plurality of high-magnification images while also seeing from where on the background image each of the high-magnification images was taken.

Figure 10:
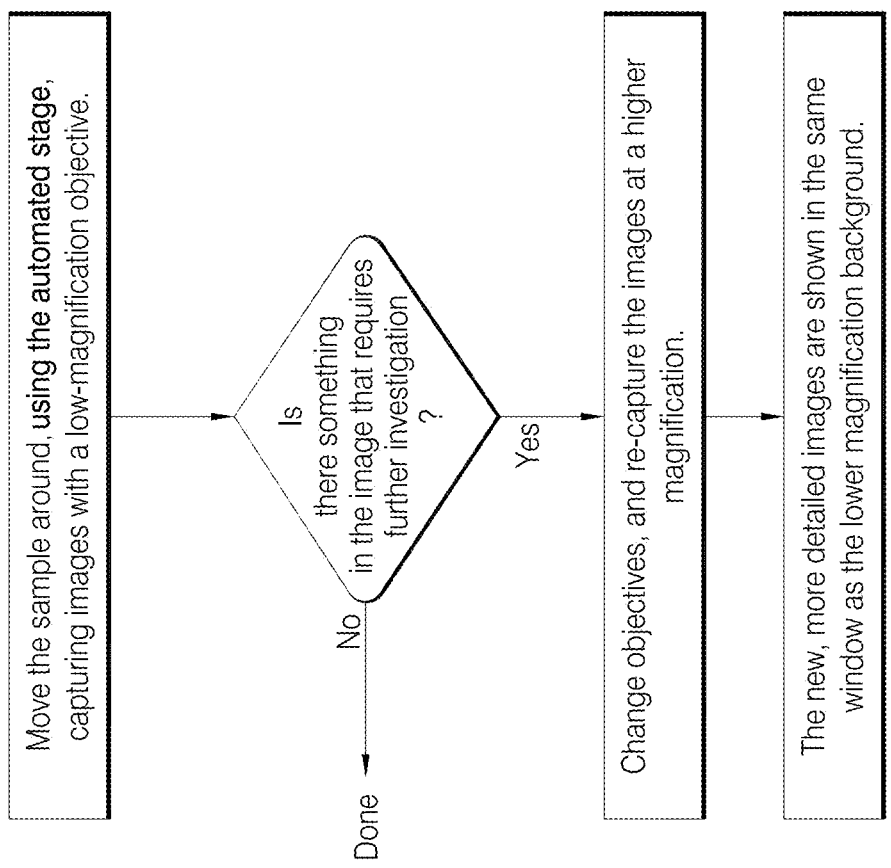
FIG. 10 provides an exemplary information flow diagram for an automatic embodiment of the disclosed methods.
Figure 11:
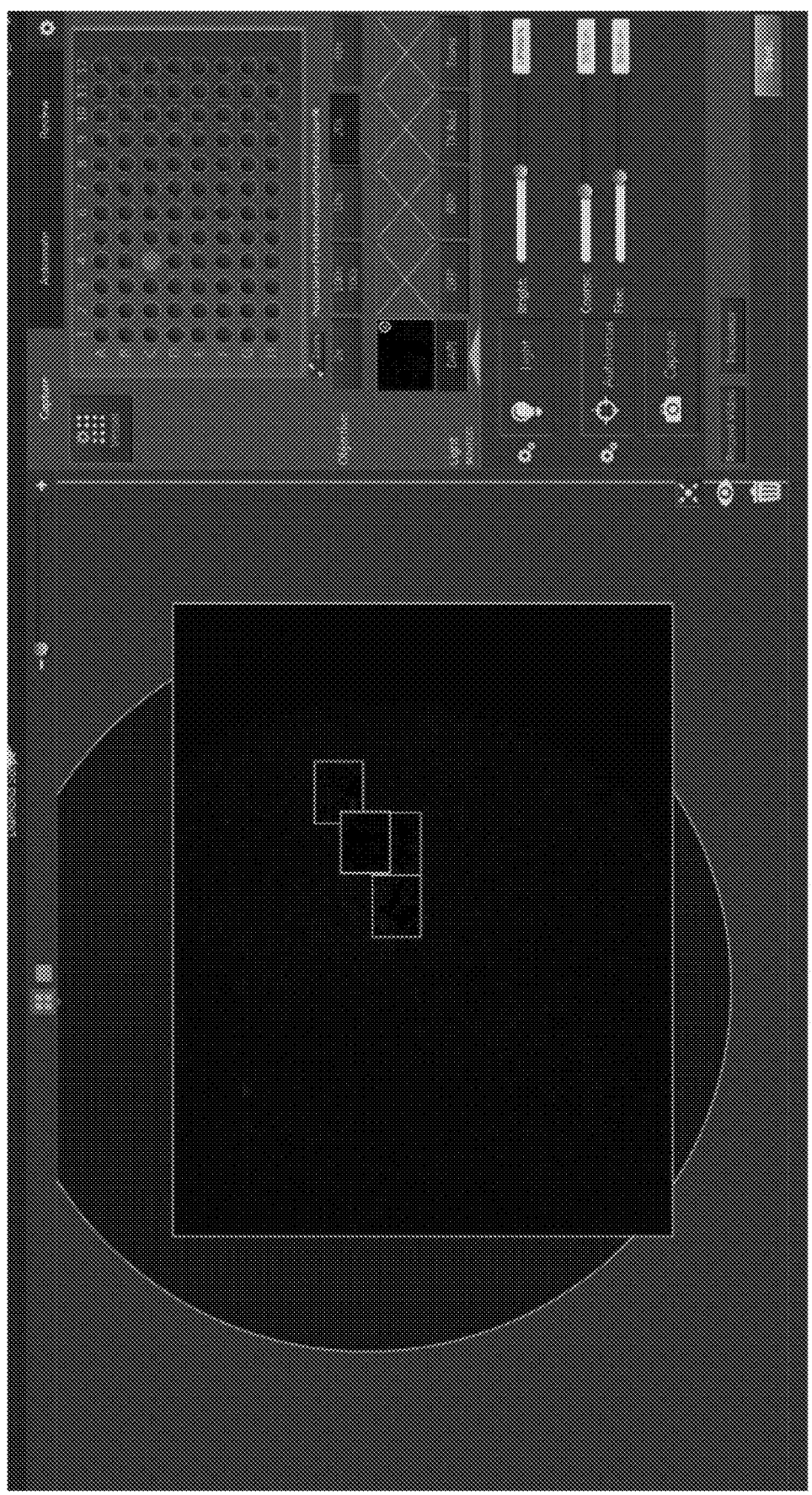
FIG. 11 provides a screen view of an exemplary embodiment of the disclosed technology.

FIG. 10 provides a typical information flow for the disclosed methods of examining areas of interest in an automated fashion. As shown in the figure, a user performs a low-magnification review of a sample, e.g., via moving the sample around via an automated stage or other automated motion. After the user identifies an area of interest within the low-magnification background image, the user can select a higher-magnification objective and then capture images of the area of interest with that higher magnification. The new, more detailed image(s) may then be shown in the same window as the lower magnification background images, as shown in FIG. 11. This approach in turns allows for the user to view the higher-magnification images in spatial context; i.e., the higher-magnification image may be overlaid on the lower-magnification background image such that the higher-magnification image is disposed above the region of the background image from where the higher-magnification image was collected. The higher-magnification image may also be displayed in a way such that a user may select that image for further magnification. In this way, a user can quickly scan through a plurality of high-magnification images while also seeing from where on the background image each of the high-magnification images was taken.

FIG. 11 provides an image taken from an exemplary embodiment of the disclosed technology. As described elsewhere herein, a user may move the sample around, either manually or with automation, using the automated stage. The user may capture images with a low-magnification objective; in FIG. 11, the largest rectangular image was taken with a 2× objective, though other objectives may of course be used. After an area of interest is identified, one may change objectives, and re-capture the images at a higher magnification. The new detailed images (shown in FIG. 11 by the smaller rectangles inset within the larger rectangle image) may be shown in the same window as the lower magnification background image. In this way, a user may see—in a single window—the more detailed images in positions that show those images' relative positions within the lower magnification background image.

As seen on the right-hand side of FIG. 11, a user interface may also include a schematic view of the sample being observed. In FIG. 11, the sample being observed is a multiwell plate, and the particular well being observed is the well located at coordinates (4, C) on the positioning grid shown at the upper right of the image. The interface may also allow the user to control/select the objective lens or lenses being used, the lighting, the autofocus, and various automation features.

Figure 12:
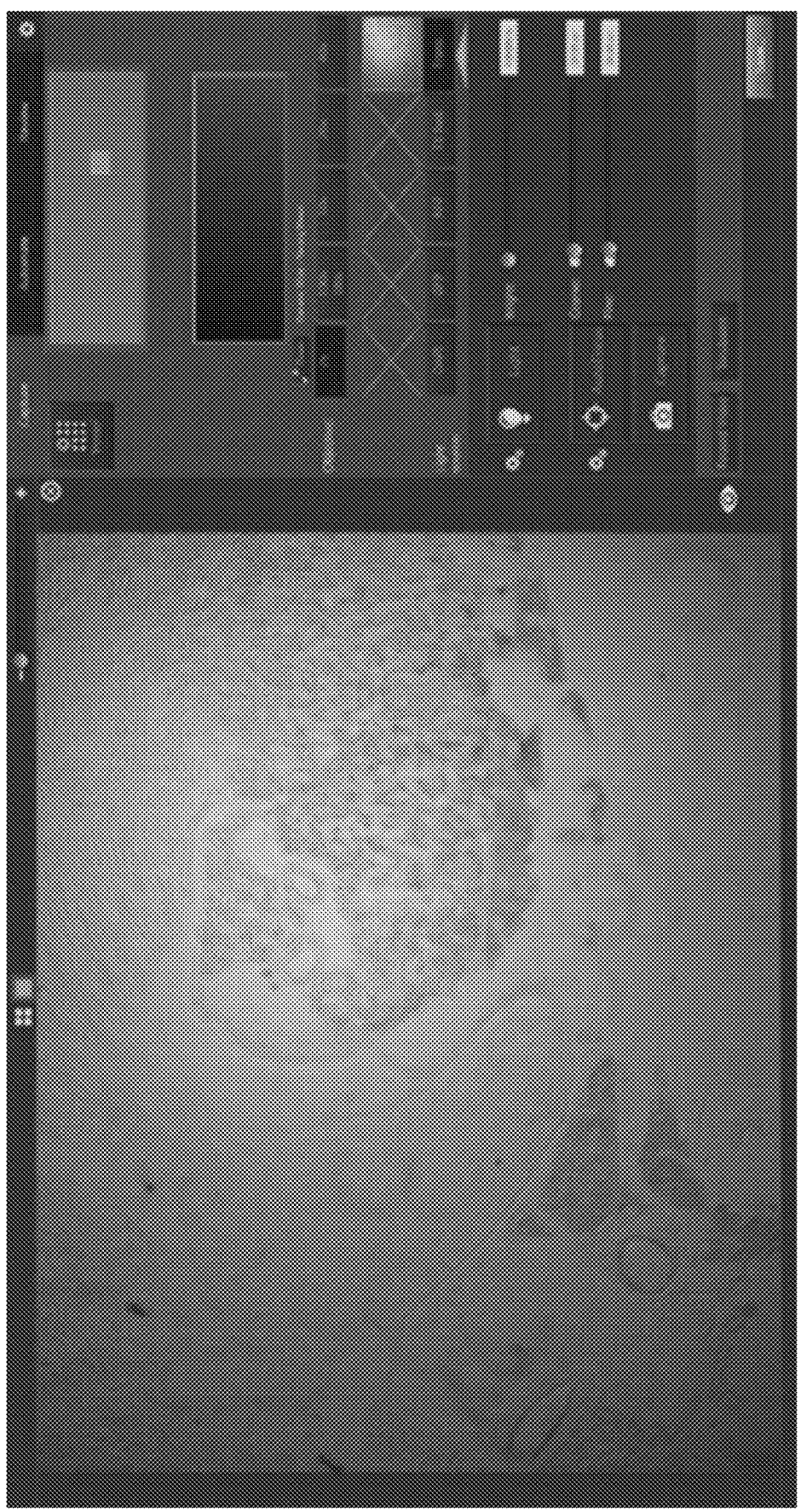
FIG. 12 provides a screen view of an exemplary embodiment of the disclosed technology showing a first level (comparatively low magnification) sample view.
Figure 13:
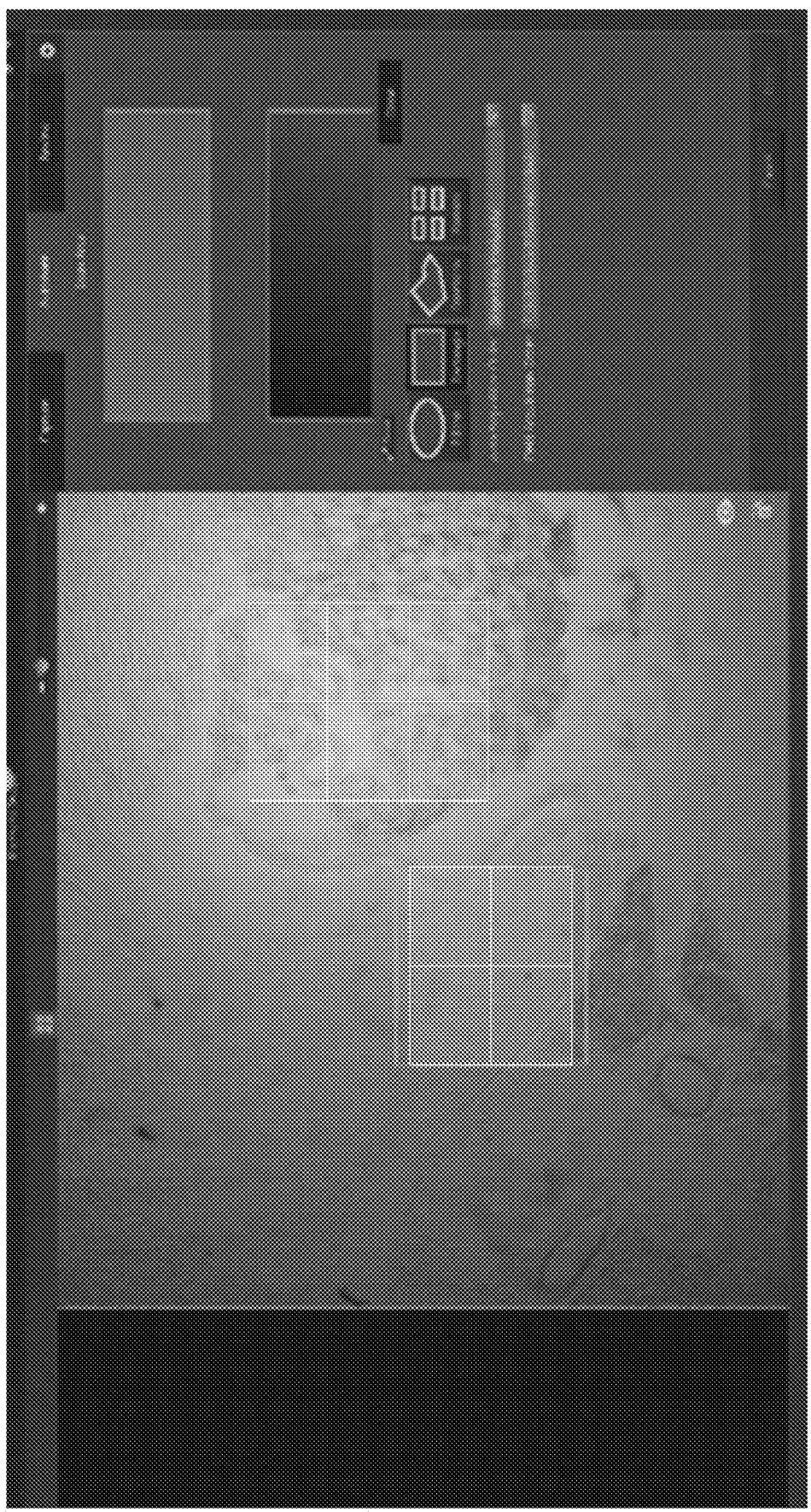
FIG. 13 provides a screen view of an exemplary embodiment of the disclosed technology showing a first level (comparatively low magnification) sample view with a second level image defined.

FIG. 12 and FIG. 13 show views from another embodiment of the disclosed technology. As shown in FIG. 12, a user may move a sample around, using the automated stage, capturing one or more images (i.e., first-level images) with a low-magnification objective. (In this example is a collection of images, taken with a 2× objective, in bright field). As shown in FIG. 13 by the rectangular-highlighted regions, while viewing the image that had been earlier acquired, areas of interest are selected for scanning at a higher magnification (e.g., 20×; second-level images).

Figure 14:
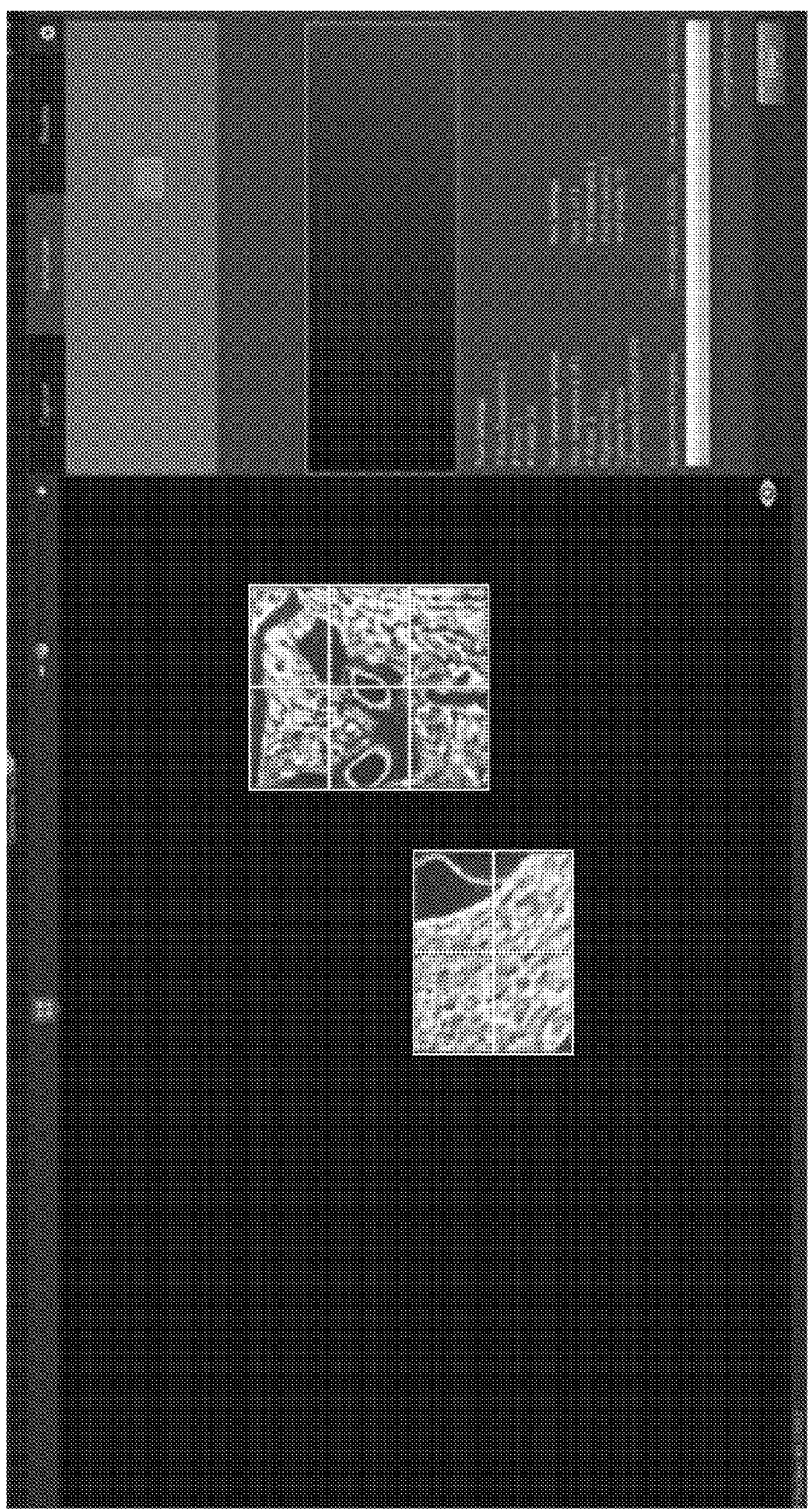
FIG. 14 provides a screen view of an exemplary embodiment of the disclosed technology showing a first level (comparatively low magnification) sample view with second level images defined.

The result of this selection and increased magnification is shown in FIG. 14. As shown in that figure, high quality images are acquired only from chosen areas without having to sort through images from the remainder of the sample slide. Also as shown in FIG. 14, the second level images may be collected under different illumination than the first level image. Second (and first) level images may also undergo further image processing (contrast adjustment, false color addition, and the like) as the user may desire.

Figure 15:
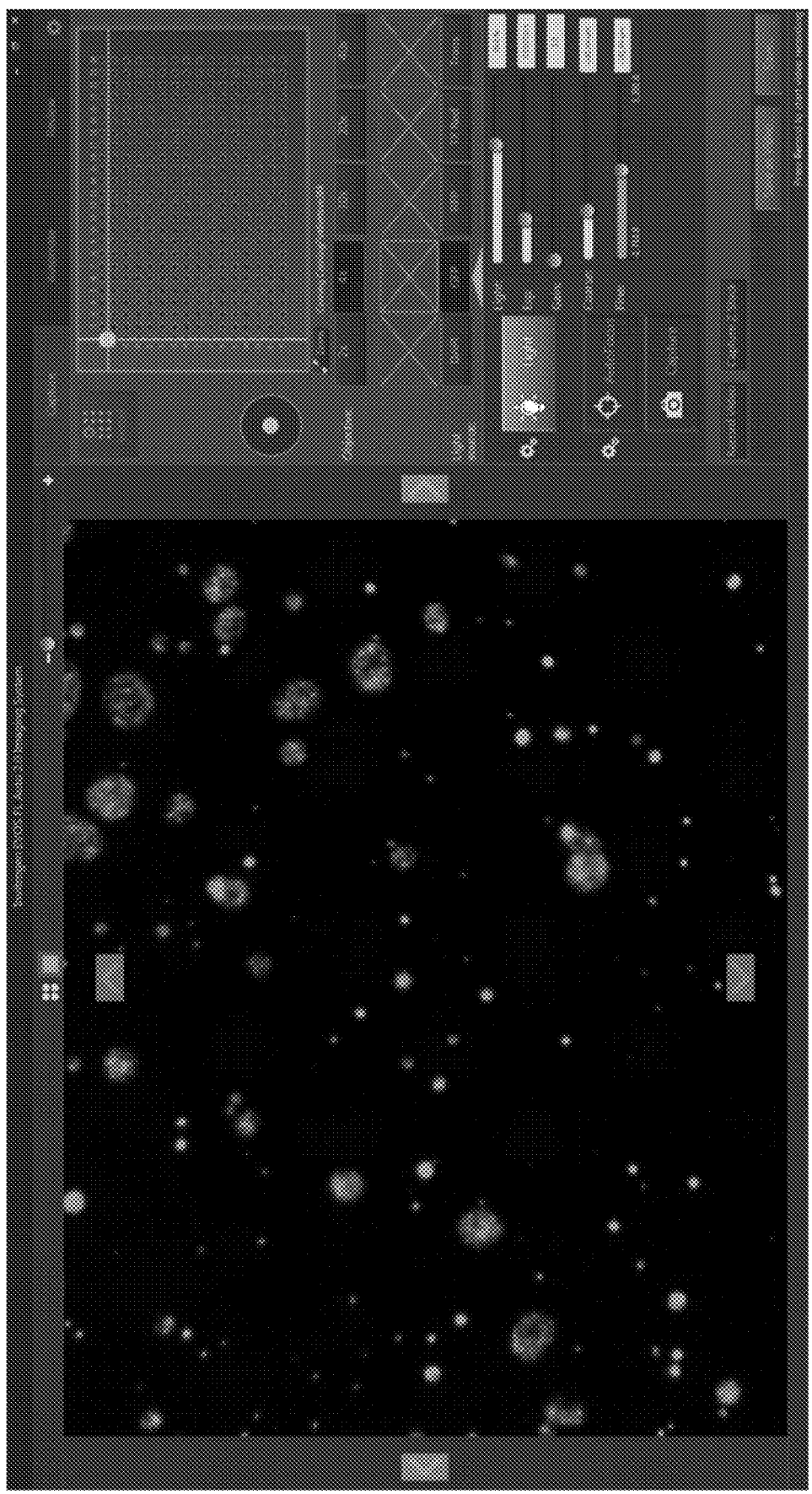
FIG. 15 provides a screen view of an exemplary embodiment of the disclosed technology showing a first level image.

FIG. 15 provides another view of an exemplary user interface. As shown in the FIG., the upper right-hand region of the interface includes three tabs—Capture, Automate, and Review. Capture tab is selected when the user desires to move around the sample and capture images of the sample. As shown, the interface includes arrows and other buttons to effect image capture and sample movement.

At the upper right of FIG. 15 is a schematic view of a sample vessel being analyzed, in this case a multi-well plate. A user may select the type of vessel by selecting a vessel from a pre-set list of vessels, e.g., by clicking on a "Vessel" button and then selected the desired vessel from a menu of vessels. Alternatively, a user can create their own vessel profile in which they specify characteristics of the vessel, e.g., well size, well spacing, and the like.

Also seen in FIG. 15 is an "Objective" button. This button allows the user to select the desired objective lens and may operate to rotate the objective lens turret in an imaging device.

Also shown is a "Light Source" button. This button operates to allow the user to select their desired illumination, e.g., the illumination color and/or intensity.

Other controls include, e.g., "Light" (allowing for further control over the illumination), "Autofocus" (allowing for control over the z-drive), and "Capture" (allowing for control over image capture).

In the upper portion of FIG. 15 are shown two buttons—one showing four small squares clustered together and another showing a single square. These buttons allow for the user to toggle between views of a first level image taken at comparatively low magnification and between second level images taken at higher levels of magnification. As shown, the view in FIG. 15 is the view of a first level image taken at a low level of magnification. The view of the second level images taken at higher levels of magnification is shown in FIG. 11.

As shown in that figure, a single well of a 96-well plate is shown (well C-4). This FIG. provides a view in which the higher magnification images are overlaid on the lower magnification images. Although not shown in FIG. 11, the higher magnification images may be aligned so that they are tiled or otherwise stitched together to form a contiguous composite image.

Figure 16:
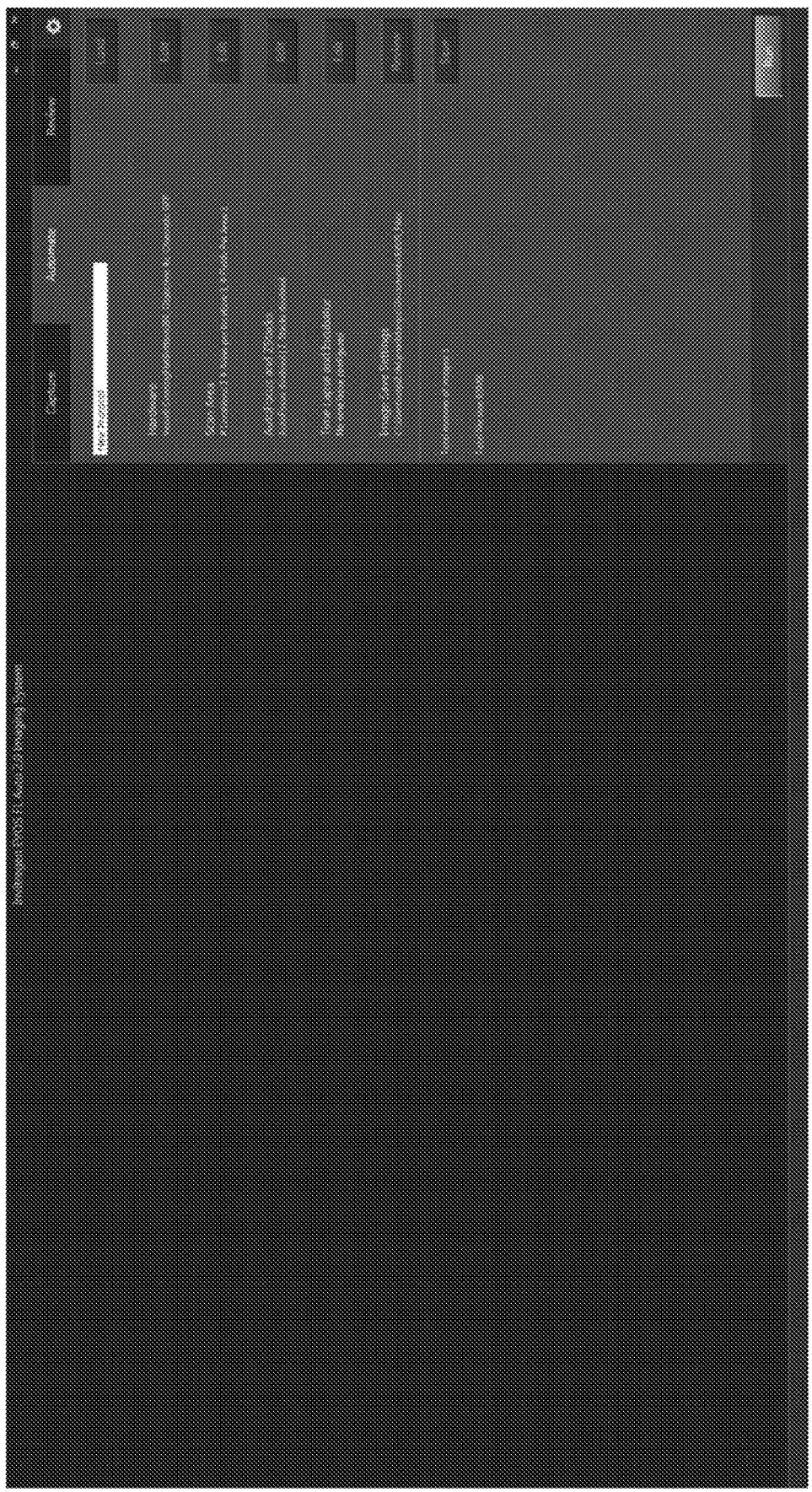
FIG. 16 provides a screen view of an exemplary embodiment of the disclosed technology showing an exemplary process control menu.

FIG. 16 provides a user view after the user selects the "Automate" tab on the interface. As shown, a user may select various parameters (hardware, scan area, autofocus and Z-stacks, time lapse, incubator, image save settings, and the like) for a given run.

Figure 17:
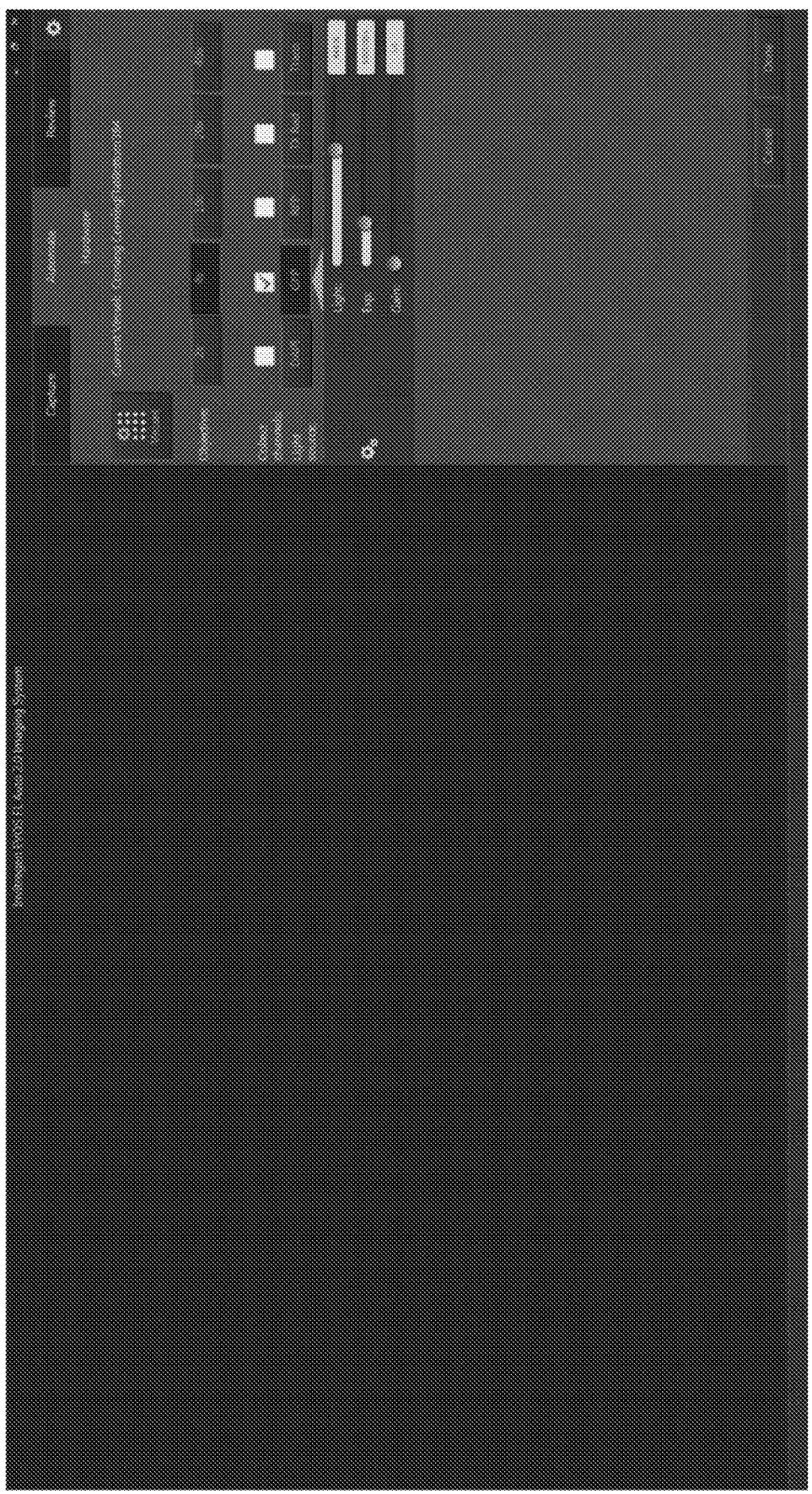
FIG. 17 provides a screen view of an exemplary embodiment of the disclosed technology showing an exemplary process control menu.

FIG. 17 provides a view following a use of the "Edit" button for the "Hardware" function in FIG. 16. As shown in FIG. 17, a user may be given the opportunity to adjust a variety of hardware parameters.

Figure 18:
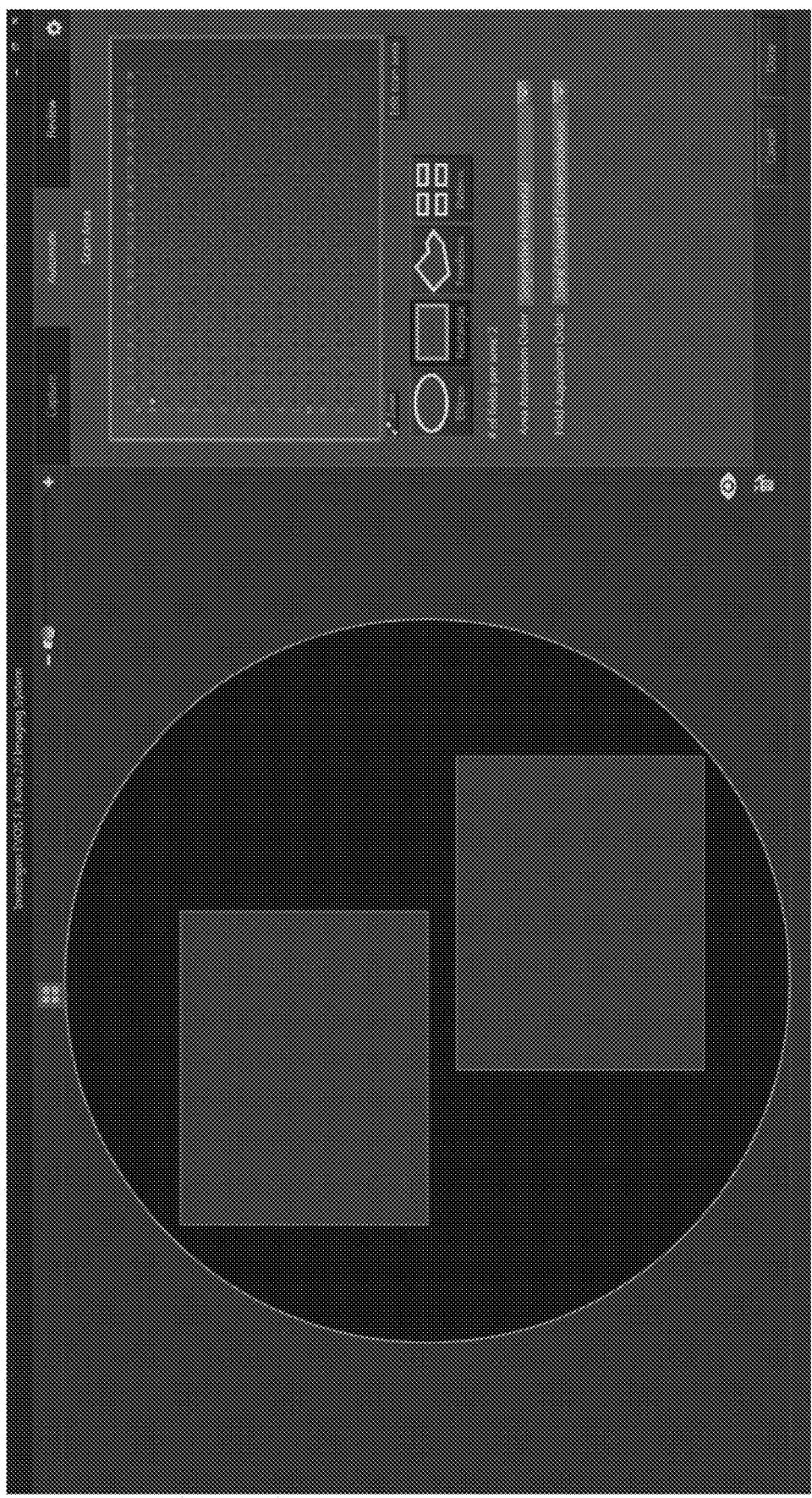
FIG. 18 provides a screen view of an exemplary embodiment of the disclosed technology showing an exemplary process control menu.

FIG. 18 provides a view of the user options for the scan area selection tab. As shown, a user may edit/adjust the scan area and may also set the size and shape of the second level images. A user may also set the number and position of second level images per first level image; in this case, the user has set the system to collect two rectangular second level images per first level image of a well.

Figure 19:
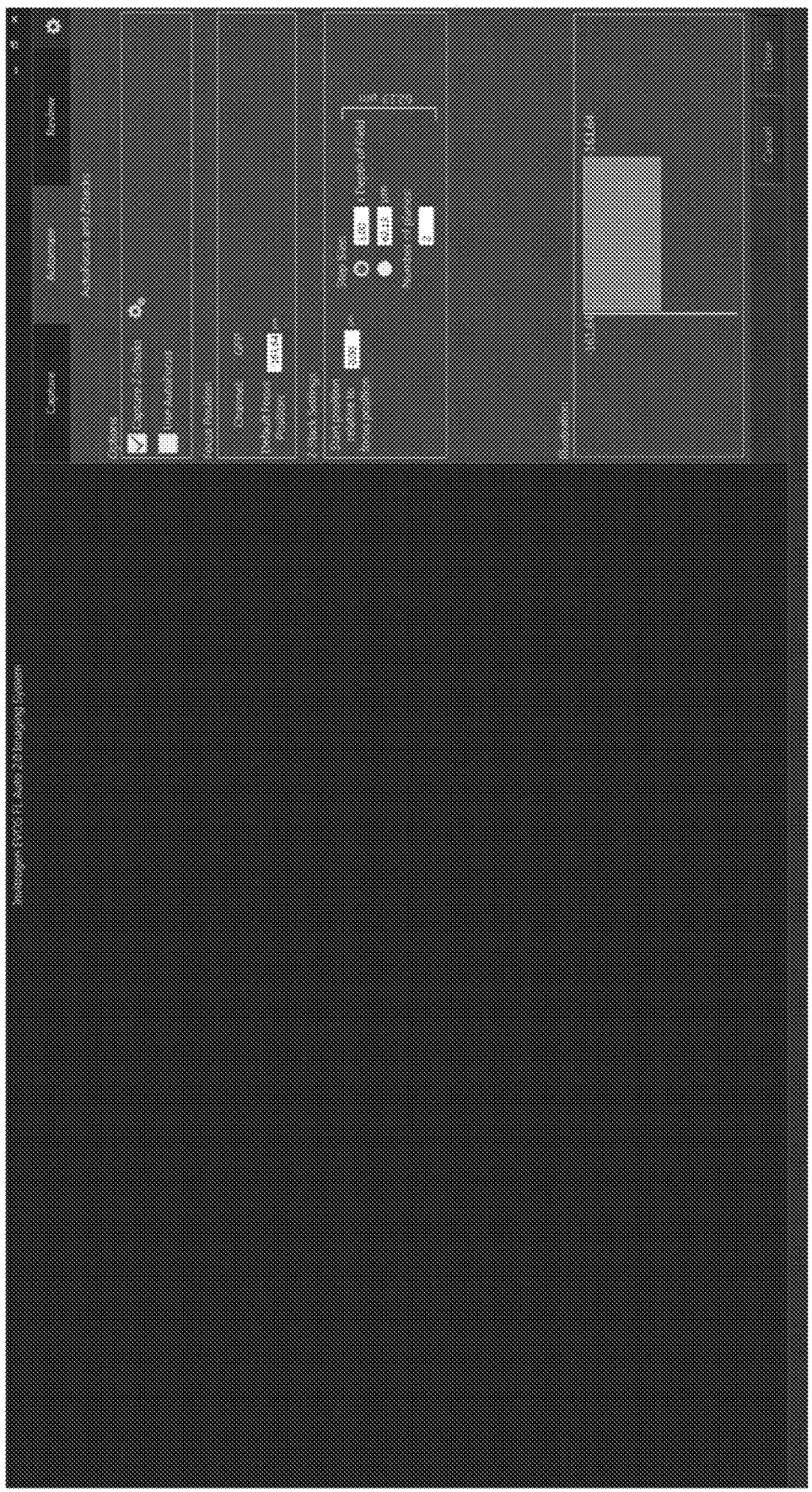
FIG. 19 provides a screen view of an exemplary embodiment of the disclosed technology showing an exemplary process control menu.

FIG. 19 provides a view of the user options for the Autofocus tab. As shown, a user may set a variety of related parameters. A system may be configured to utilize confocal microscopy. A system may also be configured to perform a so-called "smashdown" of multiple images (e.g., slices of a single image) and then generate a composite image that uses, e.g., the brightest pixel from each slice, the most in-focus pixel from each slice, and the like.

Figure 20:
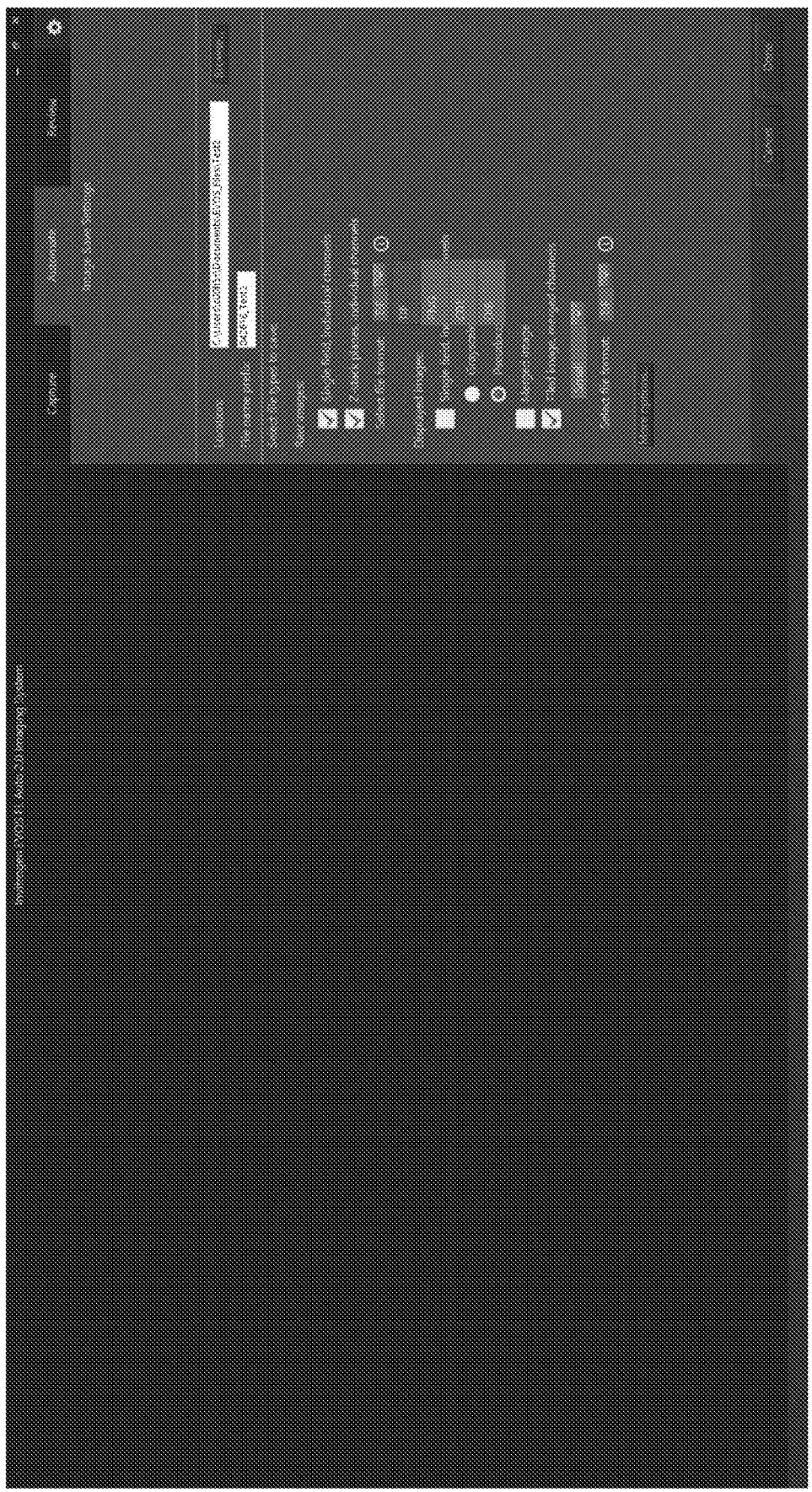
FIG. 20 provides a screen view of an exemplary embodiment of the disclosed technology showing an exemplary process control menu.

FIG. 20 provides a view of the user options for the Image Save tab. As shown, a user may save images in a variety of formats. A user may save a set of images as individual files, but can also save the image as a file that has all images in tiled relationship.

What is claimed is:

1. A method of image analysis, comprising:
    collecting, at a first level of magnification, at least one first level image of a sample, the at least one first level image collected with the sample being illuminated under a first illumination condition;
    collecting, at a second level of magnification that is greater than the first level of magnification, a first second level image that comprises a region of a corresponding first level image, the first second level image collected with the sample being illuminated under a second illumination condition that is different than the first illumination condition such that the sample is illuminated under different illumination conditions when collecting the first level image and the first second level image;
    overlaying the first second level image on the corresponding first level image to create a merged image; and
    displaying the merged image at the first level of magnification, wherein displaying the merged image comprises:
    displaying as a background, the corresponding first level image collected with the sample illuminated under the first illumination condition; and
    displaying the region of the first second level image as a high-resolution region of the merged image, the region being displayed in the second illumination condition.

2. The method of claim 1, wherein the first second level image is overlaid on the corresponding first level image such that the first second level image is positioned according to the region of the corresponding first level image that is comprised in the first second level image.

3. The method of claim 1, further comprising collecting a second second level image that comprises a region of the corresponding first level image.

4. The method of claim 3, further comprising aligning the first second level image and the second second level image such that the aligned first second level image and the second second level images form a contiguous image of a region of the corresponding first level image.

5. The method of claim 4, wherein the aligning is at least partially performed by overlapping a region of the first second level image with a region of the second second level image.

6. The method of claim 3, further comprising overlaying the first second level image and the second second level images on the corresponding first level image, wherein the first second level image and the second second level image are overlaid on the corresponding first level image such that they are positioned relative to one another according to the regions of the first level image that are comprised in the first second level image and the second second level image.

7. The method of claim 1, further comprising enabling a user to, from a view of the corresponding first level image, select and display the second level image.

8. A sample analysis system, comprising:
an imaging device configured to (a) collect first level sample images at a first level of magnification and by illuminating a corresponding sample under a first illumination condition and (b) collect second level sample images at a second level of magnification that is greater than the first level of magnification and by illuminating the corresponding sample under a second illumination condition that is different than the first illumination condition such that the sample is illuminated under different illumination conditions when the imaging device collects the first level sample images and the second level sample images,
wherein a second level sample image comprises a region at least partially disposed within a corresponding first level sample image; and
a processor configured to effect overlaying the second level sample image on the first level sample image to create a merged image, the merged image comprising, as a background, the first level sample image at the first level of magnification and illuminated under the first illumination condition and, as a high-resolution region of the merged image, the region of the second level sample image scaled to the first level of magnification and displayed in the second illumination condition.

9. The system of claim 8, wherein the processor is configured to align a feature of at least one collected second level sample image with a corresponding feature of the first level sample image that corresponds to the second level sample image.

10. The system of claim 8, wherein the processor is configured to overlay a first second level sample image on the first level sample image such that the first second level sample image is positioned according to the region of the first level sample image that is comprised in the first second level sample image.

11. The system of claim 8, wherein the processor is configured to collect a second second level sample image that comprises a region of the corresponding first level sample image.

12. The system of claim 11, wherein the processor is configured to align a first second level sample image and the second second level sample image such that the aligned first second level sample image and the second second level sample images form a contiguous image of a region of the corresponding first level sample image.

13. The system of claim 11, wherein the processor is configured to overlay the first second level sample image and the second second level sample image on the first level sample image such that they are positioned relative to one another according to the regions of the first level sample image that are comprised in the first second level sample image and the second second level sample image.

14. A method of image analysis, comprising:
collecting, at a first level of magnification a plurality of first level sample images, the plurality of first level sample images collected with the sample being illuminated under a first illumination condition;
for each member of a set of at least some of the plurality of first level sample images, collecting, at a second level of magnification greater than the first level of magnification, one or more second level sample images that comprises a region at least partially disposed within that corresponding first level sample image, the one or more second level sample images collected with the sample being illuminated under a second illumination condition that is different than the first illumination condition such that the sample is illuminated under different illumination conditions when collecting the plurality of first level sample images and the one or more second level sample images;
for at least some of those members of the set of first level sample images, aligning a feature of each of the one or more second level sample images with the corresponding feature of that corresponding first level sample image;
overlaying the one or more second level sample images on the corresponding first level sample image to create a merged image; and
displaying the merged image at the first level of magnification, wherein displaying the merged image comprises:
displaying as a background, the corresponding first level sample image collected with the sample being illuminated under the first illumination condition; and
displaying the feature of the one or more second level sample images as a high-resolution region of the merged image, the feature being displayed in the second illumination condition.

15. The method of claim 14, wherein one or more second level sample images from within two or more first level sample images are taken at the same relative positions within the respective first level sample images.

16. The method of claim 14, wherein collecting the plurality of first level sample images, collecting the second level sample images, or both, is performed in an automated fashion.

17. The method of claim 14, wherein (a) at least one or more first level sample images is based on information taken at two or more focal planes, (b) wherein at least one or more second level sample images is based on information taken at two or more focal planes, or both (a) and (b).

18. The method of claim 14, wherein collecting a first level sample image and collecting a second level sample image is performed by changing objective lenses.

19. The method of claim 1, wherein displaying the merged image further comprises masking an overlain region of the corresponding first level image with the region of the first second level image.

20. The method of claim 1, wherein the first illumination condition comprises one or more of a different color or different intensity than the second illumination condition or is generated using a different illumination source than the second illumination condition.

* * * * *